United States Patent
Farone et al.

(10) Patent No.: US 6,420,594 B1
(45) Date of Patent: Jul. 16, 2002

(54) POLYLACTATE RELEASE COMPOUNDS AND METHODS OF USING SAME

(75) Inventors: William A. Farone; Stephen S. Koenigsberg, both of Irvine; Tracy Palmer, Foothill Ranch, all of CA (US)

(73) Assignee: Regenesis Bioremediation Products, San Juan Capistrano, CA (US)

( * ) Notice: Subject to any disclaimer, the term of this patent is extended or adjusted under 35 U.S.C. 154(b) by 0 days.

(21) Appl. No.: 09/190,630

(22) Filed: Nov. 12, 1998

Related U.S. Application Data

(60) Provisional application No. 60/065,513, filed on Nov. 12, 1997.

(51) Int. Cl.$^7$ .............................................. C07C 69/66

(52) U.S. Cl. ...................................................... 560/185

(58) Field of Search ......................................... 560/185

(56) References Cited

U.S. PATENT DOCUMENTS

| | | | |
|---|---|---|---|
| 4,585,482 A | 4/1986 | Tice et al. | |
| 5,071,754 A | 12/1991 | Walkup et al. | |
| 5,264,018 A | 11/1993 | Koenigsberg et al. | |
| 5,277,815 A | 1/1994 | Beeman | |
| 5,434,241 A | 7/1995 | Kim et al. | |
| 5,560,904 A | 10/1996 | Laugier et al. | |
| 5,602,296 A | 2/1997 | Hughes et al. | |

OTHER PUBLICATIONS

DiStefano et al., Hydrogen as an Electron Donor for Dechlorination of Tetrachloroethene by an Anaerobic Mixed Culture, 11/92, Applied and Environmental Microbiology, vol. 58, No. 11, pp. 3622–3629.

Rafler, et al., Novel Biodegradable Polyesters, Abstract, American Chemical Society (1992).

Fennell, et al., Comparative Studies of Hydrogen Donors for Stimulation of Tetrachloroethene Dechlorination, 1997, International In Situ and On–Site Bioremediation Symposium—New Orleans, LA, p. 11.

Becvar, et al., In Situ Dechlorination of Solvents in Saturated Soils, 1997, International In Situ and On–Site Bioremediation Symposium—New Orleans, LA, pp. 39–44.

Brennan, et al., Anaerobic Microbial Transformation of Trichloroethylene and Methylene Chloride in Pinellas Soil and Groundwater, 1997, International In Situ and On–Site Bioremediation Symposium—New Orleans, LA, p. 45.

Dybas, et al., Slow–Release Substrates for Transformation of Carbon Tetrachloride by Pseudomonas Strain KC, 1997, International In Situ and On–Site Bioremediation Symposium—New Orleans, LA, p. 59.

Acree, et al. Site Characterization Methods for the Design of In–Situ Electron Donor Delivery System, 1997, International In Situ and On–Site Bioremediation Symposium—New Orleans, LA, pp. 261–266.

Gibson, et al., Stimulation of Reductive Dechlorination of Tetrachloroethene in Anerobic Aquifer Microcosms by Addtion of Short–Chain Organic Acids or Alcohols, 04/92, Applied and Environmental Microbiology, vol. 58, No. 4, pp. 1392 and 1393.

Smatlak, et al., Comparative Kinetics of Hydrogen Utilization for Reductive Dechlorination of Tetrachloroethene and Methanogenesis in an Anaerobic Enrichment Culture. 1996, Environmental Sciences § Technology, 30, pp. 2850–2858.

Fennell, et al., Comparison of Butyric Acid, Ethanol, Lactic Acid, and Propionic Acid as Hydrogen Donors for the Reductive Dechlorination of Tetrachloroethene, 1997, Environmental Science § Technology, 31, pp. 918–926.

DiStefano, et al., Reductive Dechlorination of High Concentrations of Tetrachloroethene to Ethene by an Anaerobic Enrichment Culture in the Absence of Methanogenesis, 08/91, Applied and Environmental Microbiology, vol. 57, No. 8, pp. 2287–2292.

Biodegradable Poly (Lactic Acid) Compositions with Improved Physical Properties, May 7, 1995, Chemical Abstracts, vol. 126, No. 11, p. 637, No. 144978t.

Shin, et al., Biodegradability of Degradable Plastics Exposed to Anaerobic Digested Sludge and Simulated Landfill Conditions, 1997, Chemical Abstracts, vol. 126, No. 22, p. 1009, No. 297116k.

Kakizawa, Yasutoshi, Process for the Preparation of Lactic Acid–Based Polyester Compositions, Apr. 2, 1997, Chemical Abstracts, vol. 126, No. 23, p. 563, Nl. 306163c.

Morse, et al., A Treatability Test for Evaluating the Potential Applicability of the Reductive Anaerobic Biological In Situ Treatment Technology (RABITT) to Remediate Chlorethenes, Aug. 25, 1997, Department of Defense–Technical Protocal (Draft).

Stover, Michael Augustine, Abstract/Thesis, 1993, No. S8892, Cornell University.

(List continued on next page.)

*Primary Examiner*—Paul J. Killos
(74) *Attorney, Agent, or Firm*—Knobbe, Martens, Olson & Bear LLP

(57) ABSTRACT

The present invention provides for a family of novel compositions to serve as substrates that release hydroxy acid slowly over time. Preferably the hydroxy acid is an α-hydroxy acid, more preferably it is lactic acid. The compositions are preferably made by reaction of poly(lactic acid) with multifunctional alcohols. Also disclosed are formulations based on the compounds and methods of use for both the compositions and the formulations. The preferred use of the compositions and formulations of the present invention is for bioremediation purposes wherein they provide a time-release source of lactic acid to support the growth and reductive activity of microbes present in a system or medium, such as an aquifer, bioreactor, soil, industrial process, wastestream, body of water, river or well. The microbes destroy or inactivate compounds which are capable of being reduced, such as nitrogen-containing organic compounds, oxygen-containing organic compounds, polyaromatic hydrocarbons, and halogen-containing organic compounds.

40 Claims, 20 Drawing Sheets

OTHER PUBLICATIONS

Smatlak, Concordia Ruth, Abstract/Thesis, 1995, No. S6362, Cornell University.

Carney, Anna P., Abstact–Ethylene as Inhibitor of Methanogenesis/Thesis, 1995, No. C289, Cornell University.

Freedman, et al., Biological Reductive Dechlorination of Tetrachloroethylene and Trichloroethylene to Ehtylene under Methanogenic Conditions, 09/89, Applied and Environmental Microbiology, vol. 55, No. 9, pp. 2144–2151.

Fathepure, et al., Complete Degradation of Polychlorinated Hydrocarbons by a Two–Stage Biofilm Reactor, 12/91, Applied and Environmental Microbiology, vol. 57, No. 12, pp. 3418–3422.

Fathepure, et al., Anaerobic Bacteria the Dechlorinate Perchloroethene, 11/87, Applied and Environmental Microbiology, vol. 53, No. 11, pp. 2671–2674.

Ballapragada, et al., Effect of Hydrogen on Reductive Dechlorination of Chlorinated Ethenes, 1997, Environmental Science & Technology, vol. 31, No. 6, pp. 1728–1734.

Carr, et al., Enrichment of High–Rate PCE Dechlorination and Comparative Study of Lactate, Methanol, and Hydrogen as Electron Donors to Sustain Acitvity, 1998, Environmental Science & Technology, vol. 32, No. 12, pp. 1817–1824.

Yang, et al., Competition for Hydrogen within a Chlorinated Solvent Dehalogenating Anaerobic Mixed Culture, 1998, Enviornmental Science & Technology, vol. 32, No. 22, pp. 3591–3597.

POLYLACTATE RELEASE COMPOUNDS AND METHODS OF USING SAME

This application claims priority under 35 U.S.C. §119(e) from Provisional Application No. 60/065,513, filed Nov. 12, 1997.

BACKGROUND OF THE INVENTION

The present invention involves compounds which release hydroxy acids slowly over time preferably α-hydroxy acids. Such compounds can serve as a time-release source of lactic acid for biodegradation of chemical compounds in various media, including soils, aquifers, bioreactors, wastestreams, industrial processes, and other systems. The compounds may also be the basis of formulations which provide a time-release source of lactic acid and other materials and compounds which stimulate growth of microbes and facilitate bioremediation. The lactic acid, which is itself a nutrient for microbes, is broken down to form other compounds which provide both additional nutrients and a source of electrons to support the microbial biodegradation of chemical compounds, preferably halogenated hydrocarbons.

Halogenated hydrocarbons are compounds composed of hydrogen and carbon with at least one hydrogen substituted by a halogen atom (e.g. Cl, Br, or F). Halogenated hydrocarbons are used for many purposes, such as solvents, pesticides, and degreasers. Degreasing products have widespread use in several industries, including dry cleaning, microelectronics, and equipment maintenance. Some of the most common halogenated hydrocarbons are methylene chloride, chloroform, carbon tetrachloride, tetrachloroethane (TCA), tetrachloroethene (PCE), trichloroethene (TCE), dichloroethene (DCE), and vinyl chloride (VC). Such compounds are commonly known as "chlorinated hydrocarbons" or "chlorinated solvents."

Chlorinated hydrocarbons have been widely used for several decades. This use, in addition to improper handling and storage, has led to extensive soil and groundwater contamination, and these solvents are among the most prevalent groundwater contaminants in the United States today. Contamination of groundwater by chlorinated hydrocarbons is an environmental concern because these compounds have known toxic and carcinogenic effects.

One common technique for decontaminating aquifers that is in current use is the pump-and-treat method. As practiced, this method utilizes a series of extraction wells drilled into a contaminated aquifer. Contaminated water is drawn through an extraction well, treated to remove or degrade the contaminant, and then returned to the aquifer through one or more injection wells or discharged to sewers or other points of non-origin. This method can be time consuming and cost-prohibitive.

Recently, attempts have been made to biodegrade chlorinated solvents in-situ using anaerobic bacteria. Some species of anaerobic bacteria used in bioremediation of chlorinated solvents degrade these solvents by reductive dechlorination. This reductive process requires a steady supply of an electron donor such as hydrogen. Some current research supports the proposition that delivery of hydrogen in a slow, steady manner is an effective way to stimulate and maintain organisms that perform reductive dechlorination and reduce competition for ambient hydrogen by other organisms. Several methods have been proposed to supply the hydrogen needed for reductive dechlorination: addition of short chain organic acids or alcohols; addition of sodium benzoate (as disclosed in U.S. Pat. No. 5,277,815); addition of fats and oils; sparging with hydrogen gas (as disclosed in U.S. Pat. No. 5,602,296); and generating hydrogen gas in-situ by electrochemical reactions or electrolysis (also disclosed in U.S. Pat. No. 5,602,296).

All of the previously mentioned methods have serious shortcomings. Addition of short chain organic acids or alcohols as well as the addition of simple organic esters or organic salts such as sodium benzoate have the problem that essentially all of the chemical is released at once in the area and is free to flow away from the contaminated area. Thus, frequent addition of the chosen compound is needed to keep a sufficient concentration of the compound in the contaminated area over time. The constant injection of high volumes of solutions will increase the volume of the system or aquifer and thereby potentially cause further spread of the contamination. Furthermore, unless special measures are taken to deoxygenate the water and solutions which are injected, the level of oxygen in the system or aquifer will rise, thus harming the anaerobic atmosphere which fosters the microbes performing the reduction.

Sparging with hydrogen requires the installation and use of pipes, manifolds, valves, and other equipment and the handling of large quantities of a highly flammable and explosive gas under pressure. Generation of hydrogen gas in-situ by chemical reaction or electrolysis as disclosed in U.S. Pat. No. 5,602,296 is, by those inventors' own admission, experimental in nature and like sparging suffers from the additional limitation in that hydrogen gas has very low solubility in water. Lastly, addition of fats and oils can provide for the slow release of hydrogen, but the method does not provide a mechanism for controlling the amount of hydrogen released. Furthermore, the amount of hydrogen released is very low compared to the weight of fat or oil that must be added.

One of the most effective substrates to provide hydrogen to a biological system is lactic acid. During anaerobic processes the conversion of lactic acid (or lactate salt) to acetic acid (or acetate salt) liberates two moles of dihydrogen (four moles of elemental hydrogen) for each mole of lactic acid or lactate consumed.

$$H_2O + H_3C-\underset{\underset{OH}{|}}{CH}-\underset{\underset{}{\overset{O}{\|}}}{C}-OH \rightleftharpoons H_3C-\underset{\underset{}{\overset{O}{\|}}}{C}-OH + CO_2 + 2H_2$$

Thus the process produces both an electron source (hydrogen) and a nutrient source for bacteria.

A convenient method of delivering lactic acid is in the form of an ester. Esters of lactic acid hydrolyze to produce free lactic acid, or lactate salt, depending on the pH of the solution.

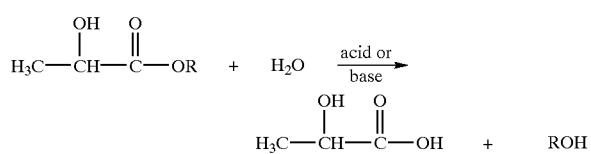

The hydrolysis reaction can be catalyzed by either acid or base, and the alcohol produced can also serve as a nutrient source for surrounding bacteria. The rate of hydrolysis is dependent upon both the pH and the alcohol with which the ester was formed. Although simple esters of lactic acid, such as ethyl lactate, delay the release of free lactic acid into solution, the lactic acid is still released and converted to hydrogen at a very high rate. This rate may be higher than the rate at which bacteria performing reductive dechlorination can consume it, and thus either be wasted or used by other bacteria which compete with the reductive dechlorinators.

SUMMARY OF THE INVENTION

The present invention relates to compounds, characterized by their ability to release hydroxy acids slowly over time. The present invention also relates to formulations comprising the compounds, as well as methods for their use in aiding bioremediation of media contaminated by contaminants capable of being remediated by microbial reduction.

In one aspect, the present invention provides for a composition comprising a multifunctional alcohol ester of a poly(hydroxy acid), wherein the poly(α-hydroxy acid) is either a α-hydroxy acid or a β-hydroxy acid, and each hydroxyl group on the multifunctional alcohol has reacted to form an ester bond with a molecule of poly(hydroxy acid).

In preferred embodiments, the poly(hydroxy acid) is an α-hydroxy acid. In especially preferred embodiments, the composition has the formula:

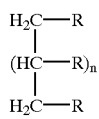

wherein R is

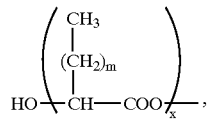

n=1 to 4, m=0 to 3, and x=1 to 10.

The present invention also provides a formulation comprising 65–99% by weight of a multifunctional alcohol ester of poly(hydroxy acid) and 1–35% by weight inorganic salts. Another formulation of the present invention comprises 14–98% by weight of a multifunctional alcohol ester of poly(hydroxy acid), 1–15% by weight inorganic salts, and 1–85% by weight of a diluent which does not interfere with the hydrolysis of an ester. Preferably, the diluent is selected from the group consisting of water, glycerin, esters, and alcohols. In other embodiments, the formulations above further comprise 0–30% by weight of one or more compounds selected from the group consisting of nutrients such as yeast extract, urea, potassium-containing compositions, nitrogen-containing compositions, phosphorous-containing compositions, sulfur-containing compositions, molybdenum salts, iron salts, zinc salts, copper salts, buffers and pH modifiers such as sodium carbonate and potassium carbonate, ethylene, chelating agents, surfactants, vitamins such as $B_{12}$, enzymes such as lipase and esterase, compounds that inhibit competing microorganisms, and bacteria and other microbes.

Especially preferred compounds of the present invention include glycerol tripolylactate, xylitol pentapolylactate, and sorbitol hexapolylactate.

In accordance with the present invention there is also provided a process of making multifunctional alcohol esters of poly(α-hydroxy acids) comprising the steps of charging a reaction vessel with solution of α-hydroxy acid; adding a catalytic amount of a strong inorganic acid; heating the reaction vessel to drive off water and cause polymerization resulting in poly(α-hydroxy acid); adding a multifunctional alcohol to the reaction vessel; heating the reaction vessel to cause esterification of the poly(α-hydroxy acid); and adding an inorganic base to neutralize at least some of the inorganic acid in the reaction vessel. In embodiments wherein the reaction vessel has a large volume, the heating step to drive off water is preferably done under vacuum. The above process may further comprise steps wherein a solvent is added with the α-hydroxy acid and the solvent is removed following addition of the inorganic base.

The present invention also provides for a method of aiding bioremediation of contaminants remediated through microbial reduction in a medium, comprising contacting the medium with applying a composition comprising an ester of an α-hydroxy acid. In preferred embodiments, the α-hydroxy acid is polymerized to form a poly(α-hydroxy acid). In other preferred embodiments, the composition comprises a multifunctional alcohol ester of poly(α-hydroxy acid) wherein each hydroxyl group on the multifunctional alcohol has reacted to form an ester bond with a molecule of poly (α-hydroxy acid). The method may also utilize formulations, as described above, which comprise the poly (α-hydroxy acid) esters. The medium is preferably selected from the group consisting of an aquifer, a bioreactor, soil, an industrial process, a wastestream, a body of water, a river, and a well.

When the medium is underground, the preferred method of aiding bioremediation comprises injecting the composition or formulation into the medium with a high pressure pump. Another preferred method comprises the steps of packing the composition into tubes or canisters having holes or slits in the sides thereof, and placing the canisters into holes drilled into the ground.

In accordance with the present invention there is provided a method of aiding remediation of chemical compositions in a medium, comprising applying a polylactate ester to the medium. Preferably the contaminants are selected from the group consisting of nitrogen-containing organic compounds, oxygen-containing organic compounds, polyaromatic hydrocarbons, and halogen-containing organic compounds. More preferably, the contaminants comprise chlorinated aromatic or aliphatic hydrocarbons. In preferred embodiments, the polylactate ester is glycerol tripolylactate, xylitol pentapolylactate, and sorbitol hexapolylactate. The medium is preferably selected from the group consisting of an aquifer, a bioreactor, soil, an industrial process, a wastestream, a body of water, a river and a well.

DETAILED DESCRIPTION OF THE PREFERRED EMBODIMENTS

Figure 1:
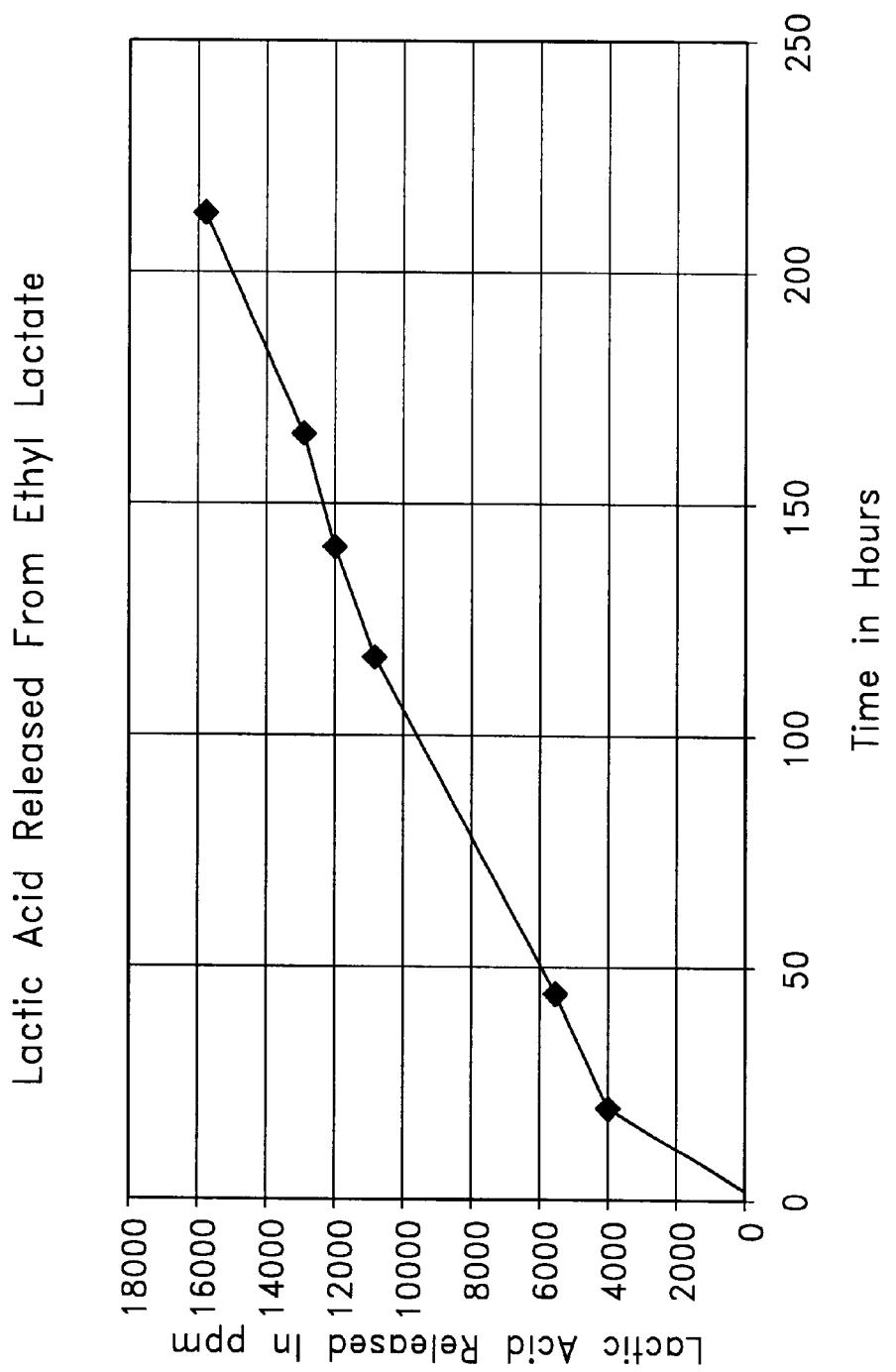
FIG. 1 is a chart which shows the rate of release of lactic acid from ethyl lactate in water, in the absence of bacteria.
Figure 2:
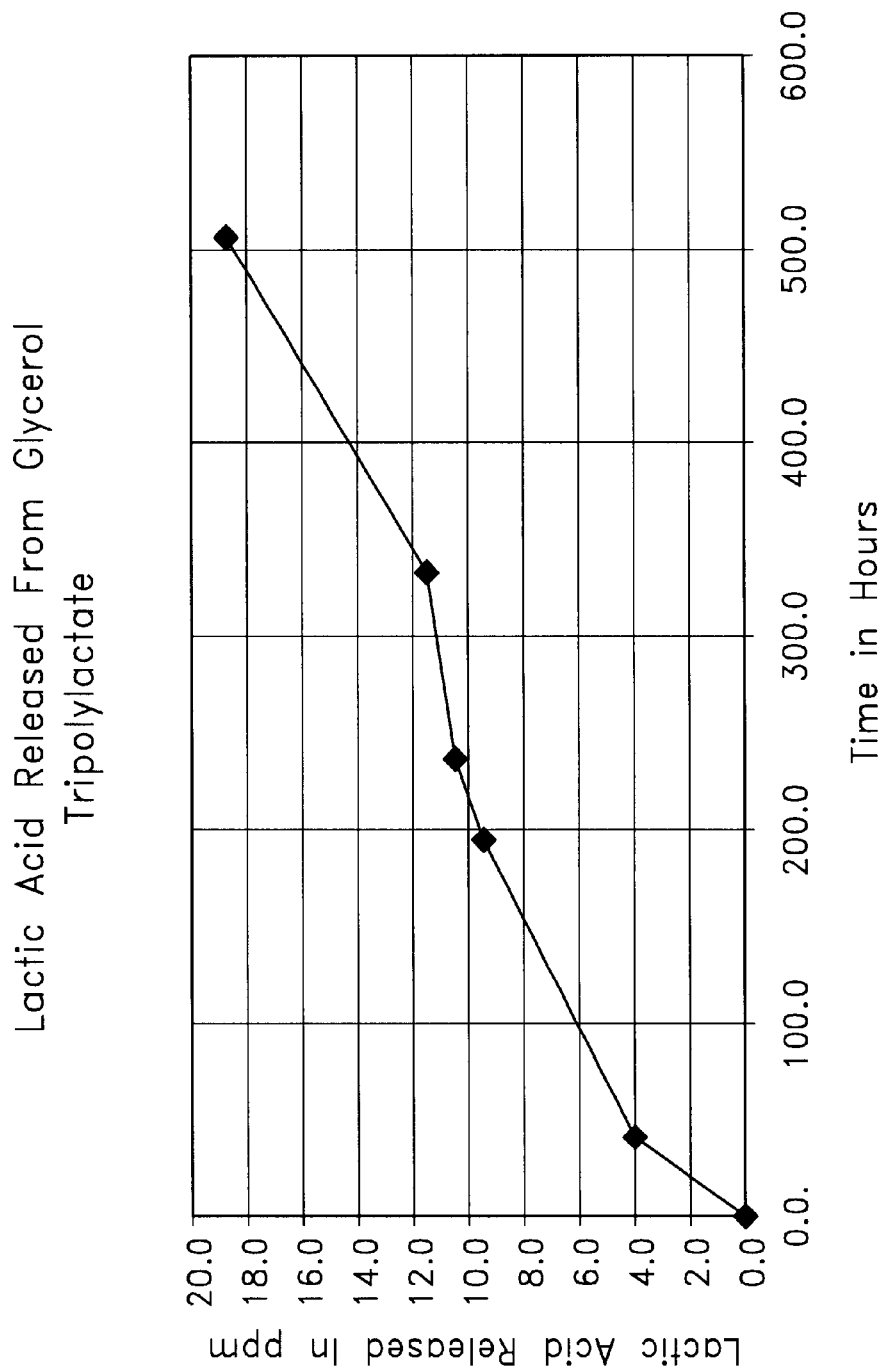
FIG. 2 is a chart which shows the rate of release of lactic acid from glycerol tripolylactate in water, in the absence of bacteria.
Figure 3:
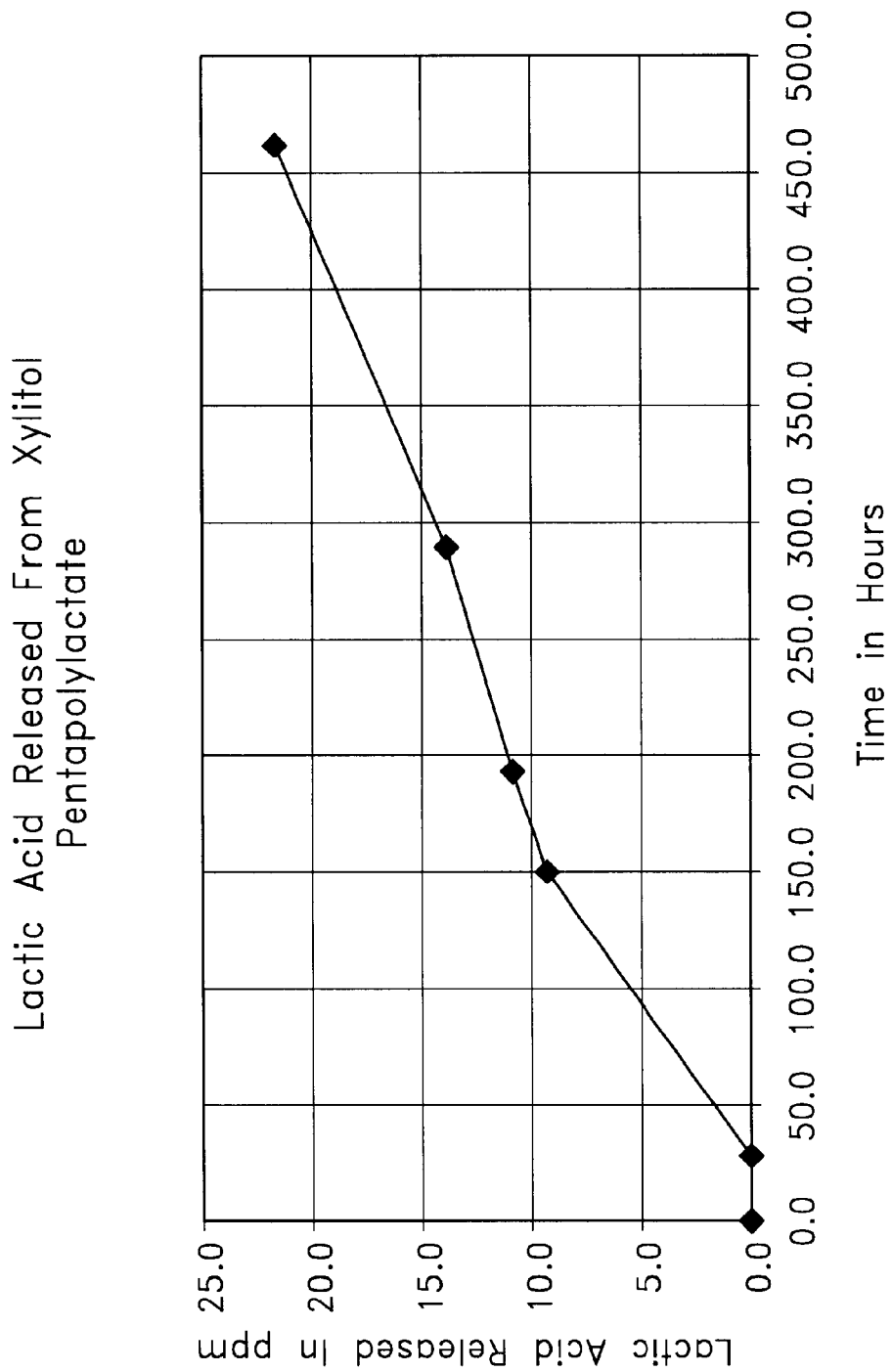
FIG. 3 is a chart which shows the rate of release of lactic acid from xylitol pentapolylactate in water, in the absence of bacteria.
Figure 4:
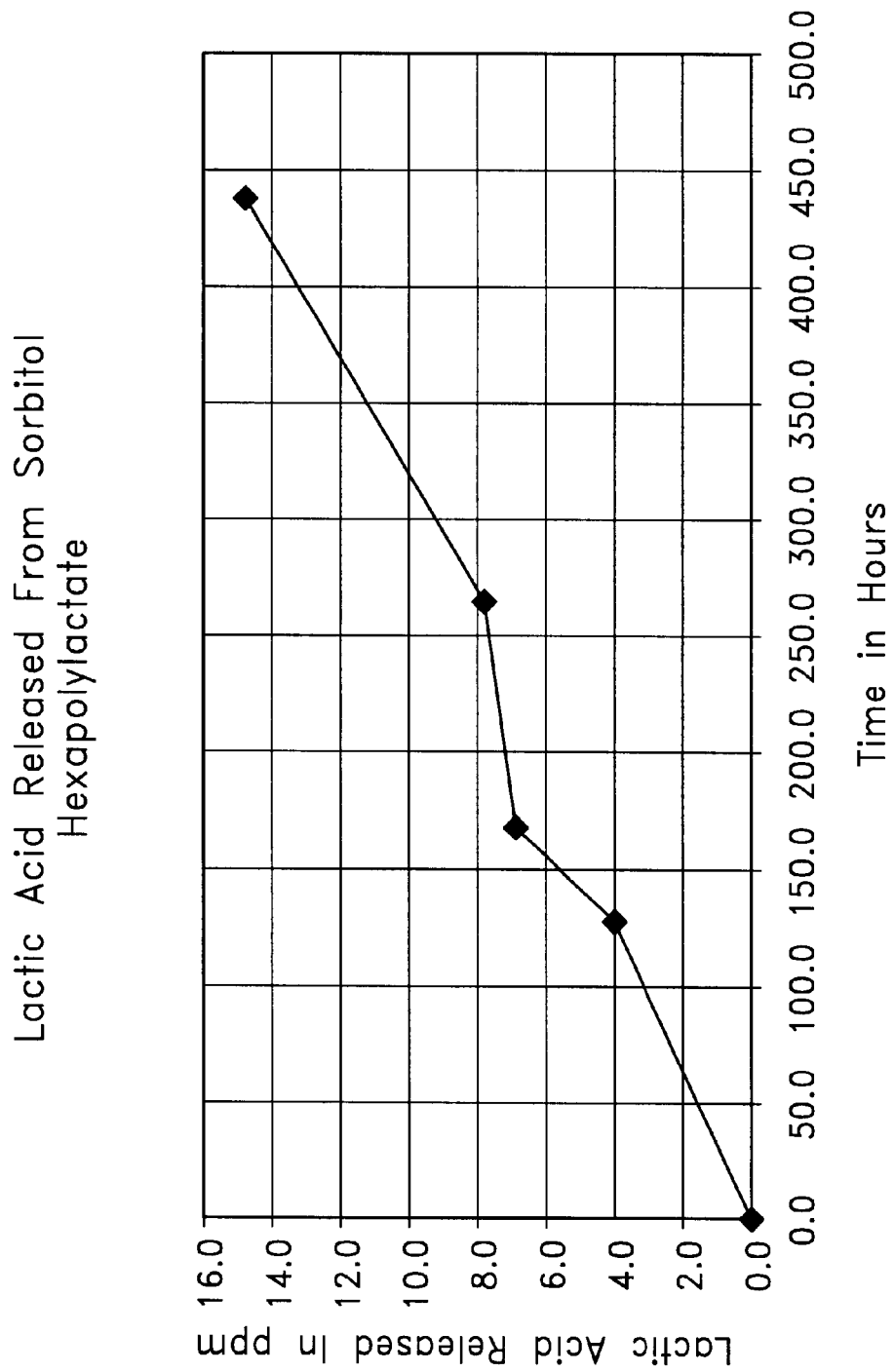
FIG. 4 is a chart which shows the rate of release of lactic acid from sorbitol hexapolylactate in water, in the absence of bacteria.

In view of the prior art, a need remains for a method to provide hydrogen that is cost-effective, safe, efficient, and requires a minimum of active management to perform. Furthermore, the method would preferably provide a known amount of hydrogen, the release of which is controlled over time, and a high quantity of hydrogen per unit weight or volume of substrate used. The present invention provides novel compounds, formulations, and methods that have some or all of these desirable qualities.

The present invention provides for a family of novel compounds to serve as substrates which release hydroxy acid slowly over time. Preferably the hydroxy acid is an α-hydroxy acid, more preferably it is lactic acid. The compounds of the present invention may be used to provide a hydroxy acid source for bioremediation of chemical compounds in aquifers, soils, wastestreams, industrial processes, or other systems, preferably by reductive dechlorination. The present invention also provides for formulations based on the family of novel compounds, as well as methods for their use in promoting bioremediation of contaminants.

The preferred compounds of the present invention are based upon polymers of α-hydroxy acids having the general formula $CH_3(CH_2)_m CHOHCOOH$, preferably where m=0, 1, 2, or 3. The most preferred embodiment is where m=0, commonly known as lactic acid. Although α-hydroxy acids where m=0 to 3 are preferred, other hydroxy acids are within the scope of the present invention, such as: α-hydroxy acids where m>3; β-, γ- or other such hydroxy acids; di- tri- or other multi-hydroxy acids; branched hydroxy acids; or substituted hydroxy acids.

Although the present invention relates to a wide variety of hydroxy acids, as discussed above, for the sake of simplicity the invention is disclosed is in terms of the most preferred hydroxy acid, lactic acid. Therefore, when in this disclosure the acids, polymers, and esters are referred to as lactic acid, lactate, poly(lactic acid), polylactate, or polylactate ester, it should be understood that it relates to all hydroxy acids, including α-hydroxy acids, and the polymers, esters, and esterified polymers thereof.

If lactic acid is first polymerized to make poly(lactic acid) and the poly(lactic acid) is reacted with a multifunctional alcohol such as glycerol, xylitol, or sorbitol, polylactate esters result that are semisolid, easy to handle, very insoluble in water, and release lactic acid at a controlled rate. The rate of release of lactic acid from these polylactate esters is comparable to the requirement for lactic acid of microbes, such as those involved in remediating halogenated solvents by reductive dechlorination. Modification of the polylactate esters, such as varying the degree of neutralization of the ester, or by adding other compounds to a formulation based upon polylactate esters, can further regulate the rate of lactic acid release.

The present invention further provides for formulations based on the polylactate esters of the present invention that serve as a source of lactic acid and other materials that may be desired in a particular application, as determined by one of skill in the art. The formulations are high in lactic acid content, and thus hydrogen releasing ability, for their weight. The formulations are preferably comprised of polylactate esters and inorganic salts. Formulations may also comprise one or more diluents, such as water, glycerin or alcohols. Additionally, formulations may contain other inorganic salts; nutrients such as yeast extract, urea, potassium-containing compositions, nitrogen-containing compositions, phosphorous-containing compositions, sulfur-containing compositions, molybdenum salts, iron salts, zinc salts, copper salts, buffers and pH modifiers such as sodium carbonate and potassium carbonate, ethylene, chelating agents, surfactants, vitamins such as $B_{12}$, enzymes such as lipase and esterase, compounds that inhibit competing microorganisms, and bacteria and other microbes. The materials other than the polylactate esters are not required for remediation, but they can provide an improved or more consistent environment for the growth and sustenance of the bacteria responsible for bioremediation.

The present invention further provides methods for the biodegradation of chemical compounds which are remediated by microbial reduction, preferably chlorinated solvents, in aquifers, soils, bioreactors, wastestreams, industrial processes, or other media and systems. The methods utilize the compounds and/or formulations of the present invention, discussed above, to provide a source of lactic acid either alone or in combination with other compounds to provide a source of electron donors (hydrogen), nutrients, and, in some embodiments, other compounds which serve to support bacterial growth.

For purposes of the disclosure herein, the term "poly (lactic acid)" is used to refer to the compound made from polymerizing lactic acid, and the term "polylactate ester" is used to refer to esterified poly(lactic acid). It is recognized that poly(lactic acid) itself is produced through an esterification process, and comprises ester groups. However, as used herein, the term "polylactate ester" is not intended to cover poly(lactic acid) before it has been esterified by reaction with a molecule other than lactic acid or homopolymers thereof.

It should also be noted that for purposes of this disclosure, the words "system" and "medium" are used in a very broad sense to refer not only to sites, systems and media in nature such as soils, aquifers, lakes, rivers, and the like, but also to man-made systems including reservoirs, holding tanks, bioreactors, wastestreams, industrial processes, wells, and the like.

The polylactate ester compounds of the present invention serve as a time-release source of lactic acid and thus, hydrogen. These compounds, which may be incorporated into formulations, are preferably used to stimulate bacterial growth and facilitate bioremediative reduction of chemical compounds. The lactic acid released by these compounds and formulations is converted to hydrogen to serve as a source of electrons which aid in bioremediation, as well as other products which provide nutrients for the growth of the bacteria. The compounds and formulations of the present invention have utility in aiding the destruction or inactivation of compounds which may be reduced, including metal compounds and metals such as chromium VI and organic compounds. Examples of some reducible organic compounds are: nitrogen-containing organic compounds such as quinoline; polynuclear aromatic hydrocarbons (PAHs) such as naphthalene; oxygen-containing organic compounds such as methyl tert-butyl ether (MTBE); and halogen-containing hydrocarbons such as trichloroethene (TCE), PCBs, and chlorofluorocarbons. The family of compounds of the present invention can be used for purposes other than the preferred use, thus the applicants do not disclaim other unnamed uses for these compounds.

The family of compounds of the present invention is referred to generally herein as polylactate release compounds or polylactate esters. Esters of poly(lactic acid) are preferred, but one may use esters of polymers of hydroxy acids other than lactic acid, such as: α-hydroxy acids other than lactic acid; β-, γ- or other such hydroxy acids; di- tri- or other multi-hydroxy acids; branched hydroxy acids; or substituted hydroxy acids.

The compounds are produced by first polymerizing lactic acid to form poly(lactic acid). Under the preferred conditions disclosed herein, the lactic acid appears to preferentially polymerize, on average, to the tetralactate. This is determined by the amount of water released during the polymerization reaction:

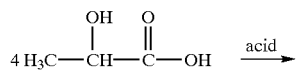

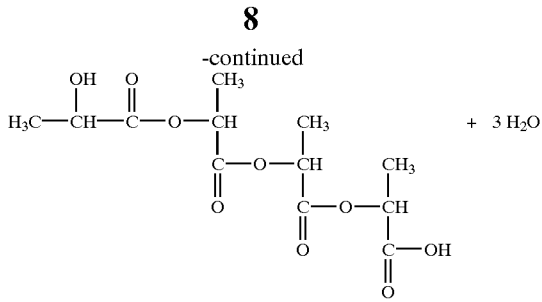

The poly(lactic acid) is then combined with an alcohol, preferably a multifunctional alcohol, in the presence of an acid catalyst to produce the ester. For purposes of this disclosure, multifunctional alcohol is defined as an aliphatic hydrocarbon wherein two or more of the carbon atoms have one hydrogen substituted by a hydroxyl group. The carbon atoms of the multifunctional alcohol can contain carbonyl groups on some of the carbons or the end groups of the molecule can be carboxyl groups. Preferred multifunctional alcohols can be further characterized in that they would not cause further pollution or contamination of a system or medium in which they are placed, and would be easily biodegraded or more preferably be used as a nutrient source for the bacteria. The most preferred multifunctional alcohols are those of the type $CH_2OH(CHOH)_nCH_2OH$ where n is preferably from 1 to 4, more preferably 1, 3, or 4, corresponding to glycerol, xylitol and sorbitol, respectively. Other preferred multifunctional alcohols are complex alcohols such as sugars, reduced sugars, and pentaerythritol.

Examples of preferred polylactate esters of the present invention made from reaction of poly(lactic acid), which has been polymerized to the tetralactate, with preferred multifunctional alcohols are:

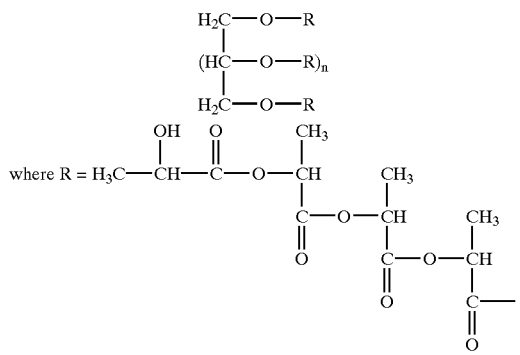

n=1 glycerol tripolylactate
n=2 xylitol pentapolylactate
n=3 sorbitol hexapolylactate Esters of different multifunctional alcohols will hydrolyze at different rates under the same conditions, dependent upon such factors as size and structure. Using such knowledge and a minimal amount of experimentation, one of skill in the art will be able to get a desired rate of hydrolysis for a particular application by appropriate choice of multifunctional alcohol as well as by varying the surrounding pH and other factors.

The preferred polylactate esters of the present invention are characterized in part by their ability to hydrolyze to poly(lactic acid), which in turn breaks down and slowly releases lactic acid monomers. These lactic acid monomers are converted, preferably by anaerobic microbial metabolism, to form a variety of compounds including acetic acid, carbon dioxide, hydrogen, and methane.

The process of releasing the lactic acid monomer into the aqueous phase from the polylactate ester takes place at a slow, controlled, and predictable rate which is dependent upon the multifunctional alcohol used in the esterification, the pH, the temperature, concentration of the polylactate ester, the surface area of the polylactate ester, and the presence of other hydrolysis catalysts such as added lipase or esterase enzymes. The rate of monomer release is also dependent upon and proportional to the microbial demand for lactic acid. The rate at which the released monomer forms hydrogen and other products is also dependent upon the microbial population in a system and the state of growth and nutrient availability. This rate can be regulated by additives in a formulation based on polylactate esters if not otherwise adequate.

The three preferred polylactate esters were also tested to determine their lactic acid release rates in water over time and compared with the lactic acid release rate of a non-polymerized lactate ester, ethyl lactate. These results are shown in FIGS. 1 through 4. The lactic acid release rates for the polylactate esters are far lower than that of the simple ethyl lactate ester and the 24 hour lactic acid release rates for polylactate esters are comparable to that required to remediate TCE.

It should be noted that these figures show results when there is no biological demand and the esters are simply placed in water. The release of lactic acid by the poly(lactic acid) is retarded by the presence of free lactic acid in solution. On the other hand, the release of lactic acid is enhanced by the presence of bacteria, with the rate of release being in concert with the demand for lactic acid by the bacteria. Thus, if lactic acid is used by microbes as it is produced, the release will continue at a rate to meet the demand of the microbes. In other words, if all of the lactic acid released in 24 hours was consumed by bacteria in those 24 hours, the next 24 hours would show a continuous higher rate of release, not the decreasing amount shown on the graphs in FIGS. 2–4.

Synthesis of Polylactate Esters

The synthesis of the polylactate esters is a process remarkable in that it produces no waste products other than water in a relatively simple one pot reaction. All materials formed, and all of their degradation products, are biologically compatible and fulfill some need of bacteria used in bioremediation.

The first step in synthesizing the polylactate esters is to make poly(lactic acid). This is done by the polymerization of lactic acid. A quantity of a lactic acid solution, preferably 80% to 100% by weight, more preferably 85% to 88% by weight, is placed in a suitably sized container or vessel. Then preferably 0.1% to 5%, more preferably 1% to 3% by weight of a strong inorganic acid, preferably phosphoric acid, is added as a catalyst. This mixture is heated to a temperature preferably between 20° C. and 180° C., more preferably to approximately 120° C., to drive off the water and polymerize the lactic acid. The lower temperatures of the preferred range are used if the mixture is under negative pressure (vacuum), as is preferred when the volume of compound being produced is large.

If longer chain hydroxyacids are used in place of lactic acid, a solvent such as dimethylformamide (DMF) or dimethylsulfoxide (DMSO) can be added to the reaction vessel. The solvent can remain in the vessel throughout the synthesis of the ester and be removed by evaporation once the synthesis is complete.

Slightly more than 3 moles of water should be driven off for every mole of lactic acid charged into the original reaction container. The reaction is complete when there is no visible sign of water being removed, or the proper amount of water has been removed. This generally takes from 2 to 8 hours, preferably from 3 to 4 hours, but is largely dependent on the heating rate, the stirring rate, and the method for condensing and removing the water. Application of a negative pressure (vacuum) can be used to facilitate water removal in larger vessels. This process results in poly(lactic acid) that is polymerized to about the tetralactate.

The second step is the esterification of the poly(lactic acid). Any multifunctional alcohol can be used, as the term is defined above. Preferred multifunctional alcohols are of the type $CH_2OH(CHOH)_nCH_2OH$ where n is preferably from 1 to 4, more preferably 1, 3, or 4, corresponding to glycerol, xylitol and sorbitol, respectively.

While adding the alcohol, the temperature of the reaction container and its contents is preferably reduced to 60° C. to 100° C., more preferably approximately 80° C. Alternatively, the temperature can be kept at that used for the polymerization, and in such a case the alcohol will preferably be added under pressure. Preferably, an amount of multifunctional alcohol is added to the vessel so that there is one poly(lactic acid) molecule therein for each hydroxyl group added. In other words, the most preferred molar ratio of total poly(lactic acid) in the reaction vessel to total molar hydroxyl groups on multifunctional alcohols added is approximately 1:1. Ratios from 2:1 to 1:2 are also preferred, but the most preferred ratio is 1:1 to 1:1.1. The temperature of the mixture is preferably set to 20° C. to 180° C., more preferably 120° C. Lower temperatures are chosen if the mixture is under negative pressure (vacuum).

When approximately one mole of water for each molar equivalent of hydroxyl group added has been removed, the heat is turned off. The removal of water will generally take from 1 to 3 hours, preferably about 2 hours, depending on the heating rate, stirring rate, and the method for condensing and removing the water. In larger vessels, negative pressure may facilitate water removal.

After the heat is turned off, an amount of an inorganic base approximating the neutralization equivalent of the inorganic acid is added with stirring. The inorganic base is preferably any of a wide variety of metal oxides and hydroxides or other basic species, such as magnesium hydroxide, calcium hydroxide, magnesium oxide, magnesium carbonate, calcium carbonate, sodium carbonate, or potassium carbonate. The base can be added soon after the heat is turned off or it can be added at any time during cooling. If the base is added once the reaction mixture has cooled to a temperature at or near room temperature, the mixture is preferably reheated to allow good mixing.

If a solvent such as DMF or DMSO was added to the reaction vessel, that solvent is removed by evaporation, preferably under reduced pressure, to give the final product.

The degree of neutralization of the acid catalyst as determined by the amount of base added, can be chosen as to buffer the aqueous treatment system or effect a mechanism to create a microenvironment of reduced or elevated pH in the polylactate ester matrix. Reduced or elevated pH in the matrix facilitates hydrolysis of the polylactate ester when the matrix is exposed to water. This is because hydrolysis of the ester may be catalyzed by either acid or base, with the rate increasing the farther the pH gets from neutral in either direction.

The polylactate esters of the present invention are preferably semisolid, colorless to tan to dark amber, are not light sensitive, and can be stored in a manner to create long term stability. The preferred polylactate esters generally melt in the range of 60° C. to 90° C. and can be made to flow in containers of any shape or shaped into any configuration. They can be mixed with powders or other solids if a more granular product is desired.

EXAMPLE 1

Preparation of Glycerol Tripolylactate

The poly(lactic acid) was made by adding 100.56 grams of 85% lactic acid to a 400 ml beaker. Next, 3.61 grams of 85% phosphoric acid was added. The temperature was set at 120° C. to drive off the water and polymerize the lactic acid. The reaction is complete when there is no visible sign of water being removed, approximately three to four hours. After the formation of the poly(lactic acid), 10.14 grams of glycerol was added and stirred. The reaction was heated and stirred at 120° C. for another two hours to produce the glycerol tripolylactate. The phosphoric acid was neutralized with 3.78 grams of magnesium oxide. A total of 53.45 grams of product was produced.

EXAMPLE 2

Preparation of Xylitol Pentapolylactate

The poly(lactic acid) was made by heating 101.88 grams of 85% lactic acid and 3.56 grams of 85% phosphoric acid at 120° C. for three to four hours to remove the water from the reaction mixture. After three hours 10.66 grams of xylitol was added to the reaction. The xylitol melts and the reaction was heated and stirred for an additional two hours. The heat was turned off and the xylitol pentapolylactate became very thick at room temperature. It was reheated to melt the ester and 1 gram of magnesium oxide was added to neutralize the phosphoric acid. A total of 65.61 grams of product was made. The xylitol pentapolylactate was thicker and harder than the glycerol tripolylactate.

EXAMPLE 3

Preparation of Sorbitol Hexapolylactate

The poly(lactic acid) was made by adding 102.77 grams of 85% lactic acid into a 4000 ml beaker. 3.03 grams of 85% phosphoric acid was then added. The mixture was heated to 120° C. for four hours until it was apparent that the water had been removed. After the water was removed, 11.75 grams of sorbitol was added and the polylactate continued to react for another 2 hours. The phosphoric acid was neutralized with 1.0 gram of magnesium oxide. A total of 66.47 grams of sorbitol hexapolylactate was produced. The sorbitol hexapolylactate is the hardest and thickest of the three esters.

Production of Formulations

The present invention further provides for formulations comprised of the polylactate esters described above. Formulations are comprised of materials that provide an environment to better support the growth of bacteria needed for the reductive bioremediation of chemical compounds, preferably those bacteria which perform reductive dechlorination. The exact composition of any particular formulation is preferably tailored to fit the particular system or medium where the formulation is to be used, however all formulations are comprised of at least one polylactate ester. One of skill in the art can determine, by known testing methods, the state of conditions necessary for bacterial growth such as pH and concentrations of nutrients, minerals, and dissolved gases, and thus be able to determine what materials would best support bacterial growth in the target system if added to the formulation.

The formulations preferably comprise 50% to 100% by weight of polylactate ester, more preferably 65% to 99%. Formulations can also contain preferably 0% to 35%, more preferably 1% to 15% by weight of one or more inorganic salts, such as those formed when the esterification reaction is neutralized. Formulations may also comprise a total. of preferably 0% to 30% by weight of other compounds including nutrients such as yeast extract, urea, potassium-containing compositions, nitrogen-containing compositions, phosphorous-containing compositions, sulfur-containing compositions, molybdenum salts, iron salts, zinc salts, copper salts, buffers and pH modifiers such as sodium carbonate and potassium carbonate, ethylene, chelating agents, surfactants, vitamins such as $B_{12}$, enzymes such as lipase and esterase, compounds that inhibit competing microorganisms, and bacteria and other microbes. Any such other compounds in the formulation will generally be present in levels much lower than the preferred upper level of 30% by weight. In the case of micronutrients, the amount added would be close to zero, if any is added at all.

The formulations of the present invention may further comprise one or more diluents. Preferred diluents are those which are water-miscible or water-soluble and do not interfere with the hydrolysis of an ester. Examples of preferred diluents include, water, glycerin, esters (such as ethyl lactate and ethyl acetate), and alcohols (such as isopropyl alcohol, and ethyl alcohol). Diluents, if present, are preferably 1–85% of the formulation by weight. More preferably, the amount of diluent is 10–25% or 50–85%.

Formulations of the present invention may also be mixed with a powder or other solid, such as clay, to form a granular product. The solid material added to make the granular form is not, however, considered to be part of the for the purpose of determining the relative quantity of the components thereof, as described above.

EXAMPLE 4

Preparation of a Formulation Comprising Glycerol Tripolylactate

The poly(lactic acid) was made by adding 105.50 grams of 85% lactic acid into a 400 ml glass beaker. Three grams of 85% phosphoric acid was added. The solution was heated to 120° C. for four hours until all of the water was removed. After the formation of the poly(lactic acid), 10.25 grams of glycerol was added. The mixture was stirred rapidly and continued heating at 120° C. for an additional two hours. The phosphoric acid was neutralized with 1 gram of magnesium oxide. 2.3 grams of yeast extract (nitrogen source) was added to the hot mixture. The formulation solidified upon cooling.

EXAMPLE 5

Preparation of a Formulation Comprising Xylitol Pentapolylactate

The poly(lactic acid) was made by adding 100.00 grams of 85% lactic acid into a 400 ml glass beaker. 3.05 grams of 85% phosphoric acid were added. The solution was heated to 130° C. for four hours until all of the water was removed. After the formation of the poly(lactic acid), 10.00 grams of xylitol was added. The mixture was stirred rapidly and continued heating at 130° C. for an additional two hours. The phosphoric acid was neutralized with 1 gram of magnesium oxide. 1.5 grams of urea (nitrogen source) was added to the hot mixture. The formulation solidified upon cooling.

EXAMPLE 6

Preparation of Formulation Comprising Xylitol Pentapolylactate

The poly(lactic acid) was prepared by heating 100.00 grams of 85% lactic acid and 3.00 grams of 85% phosphoric acid at 120° C. for three hours to remove the water from the reaction mixture and make the poly(lactic acid). Then 10.75 grams of xylitol was added to the reaction and the resulting mixture heated for two hours. 12.00 grams of potassium carbonate was added to neutralize the phosphoric acid. The mixture was then cooled to room temperature. Because potassium carbonate was added in excess of what was needed for neutralization, some potassium carbonate remains in the formulation.

Methods of Use

The present invention further provides methods of treating systems by application of the above-mentioned polylactate ester compounds or formulations that provide a time-release source of lactic acid. For purposes of this disclosure, the words "system" and "medium" are used in a very broad sense to refer not only to sites and systems in nature such as soils, aquifers, lakes, rivers, and the like, but also to man-made sites and systems including reservoirs, holding tanks, bioreactors, industrial processes, wastestreams, wells, and the like.

The polylactate ester compounds or formulations are preferably semisolids or viscous flowable liquids. The semisolids can be delivered as a single piece or in several pieces and can be molded or formed into a rod or other suitable shape of any size. Small pieces of the semisolids can be made and dispersed in water to form fluid suspensions. The viscous liquids may be used in concentrated form, or they may be mixed with one or more diluents. The viscous liquids, diluted liquids, and suspensions may be poured or injected into the system to be treated. Thus, several different alternatives are available, and one of skill in the art can choose the form, shape, size, viscosity, and consistency of the compound or formulation to fit a particular application.

A system or medium is treated by applying a compound or formulation of the present invention directly to the area to be treated. The application of the formulation or compound can be done by any of a number of methods, including mixing it with the medium (such as soil), placing it directly into an underground aquifer through a well or other opening, or by adding it to a reservoir in a bioreactor. Materials in wastestreams or industrial processes are preferably passed through or diverted to areas wherein they are treated by use of the compounds and formulations of the present invention. In one preferred method, the compound or formulation is injected into the system or medium such as a well or aquifer by a high pressure pump. Other methods of applying the compounds and formulations of the present invention to treat systems and media may be determined based upon the particularities of a given system or situation, in view of the disclosure herein.

In some instances, as the reductive bioremediation progresses, large quantities of compounds or daughter products may be present in a system which are amenable to aerobic (or oxidative) remediation as well as anaerobic (or reductive) remediation. Such compounds include the daughter products VC and DCE which are produced from the reductive bioremediation of PCE and TCE. In this kind of a situation, one may either continue use the anaerobic pathway, disclosed herein, which will eventually lead to complete remediation or one may provide for a source of oxygen downstream from where the polylactate esters are used. Oxygen may be provided methods such as aeration. One preferred method of providing oxygen downstream is to add an oxygen-releasing compound. Preferred oxygen-releasing compounds are metallic peroxides intercalated with a source of simple phosphate, as disclosed in U.S. Pat. No. 5,264,018, which is hereby incorporated by reference in its entirety.

The quantity of polylactate ester or formulation to be added is determined by the use of standard methods, dependent upon the particular system, which are known in the art. There is preferably at least enough lactic acid (in the form of poly(lactic acid)) in the compound or formulation to allow for the complete consumption of the target chemical(s). The polylactate ester compound or formulation can be present in excess of the amount calculated for complete remediation. Although it is not really possible to state an upper limit for the quantity of excess that can be used, it should be noted that experiments have shown that a large excess of polylactate ester, on the order of several hundred percent, had no discernable negative effect on the systems tested.

Testing of polylactate esters and formulations comprising polylactate esters was done in both the laboratory and the field. There were three types of laboratory tests: test tube microcosm studies, Reductive Dechlorination Reactor (RDR) studies, and Aquifer Simulation Vessel (ASV) studies. There were also three different types of field tests performed using the preferred polylactate esters of the present invention.

Laboratory Tests

The laboratory tests described herein were used to help determine parameters which may be extrapolated to use in the field and learn details about how the various elements in the remediation system interact in a controlled environment. Methods like those disclosed below may be used for other purposes, or the methods and apparatus may be adapted to other situations. For example, the Aquifer Simulation Vessel may be used to remediate industrial wastestreams, or the Reductive Dechlorination Reactor may be used to remediate laboratory waste.

As part of the tesing, several parameters are recorded and the concentrations of several compounds are measured to monitor the progress of the remediation. The breakdown of PCE into lower chlorinated compounds is determined, in part, by monitoring the concentrations of the lower chlorinated compounds, TCE, DCE, and VC. TCE, DCE and VC were measured by gas chromatography using a silica column on an SRI GC outfitted with both a PID and FID detector. Toluene was used as the internal standard in gas phase measurements. In certain cases, a second GC system is used for gas phase analysis (FID). This system also uses toluene as the internal standard. The organic acids (such as lactic acid) are measured using liquid chromatography with a Retek C18 column and a UV detector. Citric acid is used as the internal standard.

Bacterial counts are made using standard plate pour techniques, as are known in the art. Three populations are measured. The first population is aerobic, measured by total plate counts (TPC) based on a glucose nutrient agar plate. This is the normal test used for groundwater. The results are reported as the number of Colony Forming Units per ml. Then to measure the anaerobes, the same test media is used, but the plates are incubated anaerobically under nitrogen. These counts are reported as anaerobic TPC. Finally the standard AWWA test is used for sulfate reducing bacteria (SRB) to measure the SRB content in the soil water. The rationale for this test is that the SRBs thrive at a redox potential that is close to the optimum for dechlorination. Although the microbes which are dechlorinators are not necessarily SRBs, the presence of SRBs indicates that the conditions may be suitable for reductive dechlorination. One must be aware, however, that a high SRB count also indicates a high level of competition for hydrogen so that more polylactate ester will be required.

Test Tube Microcosm Studies

The test tube system was studied extensively before it was used for site treatability screening. It has been tested with various levels of bacteria and with various levels of chlorinated compounds to help determine the range of useful parameters. In the initial stages of development, the use of polylactate esters for remediation of trichloroethylene (TCE) was studied in tightly capped 200 ml test tubes to simulate reaction conditions in an anaerobic aquifer. The basis of these experiments was to measure the release of lactic acid from polylactate esters as a function of both bacterial concentrations and polylactate ester concentrations, and the concomitant reductive dechlorination of TCE.

The method may be run with either purified sand to which microorganisms are added, or soil samples from the field may be used to help determine the adequacy of the existing sample microbes for the purpose of dechlorination.

EXAMPLE 7

Test Tube Experiments Using Sterilized Sand

In the experiments, 10 grams of sterilized sand was added to each test tube followed by a solution TCE with a concentration of up to 140 mg/L. Various quantities of bacteria capable of reductively dechlorinating TCE were then added from a recirculating fluid media bioreactor (RDR) at dilutions of 1:10 and 1:100. Finally, 0.5 or 1.5 grams of polylactate ester was added to each test tube. Also included was a sample containing a 1:1000 bacterial dilution with 0.5 grams polylactate ester and a control containing a 1:1000 bacterial dilution and no polylactate ester. Each day, 6 ml samples were taken and analyzed for TCE and lactic acid. Results are shown in FIGS. 5–8.

Figure 5:
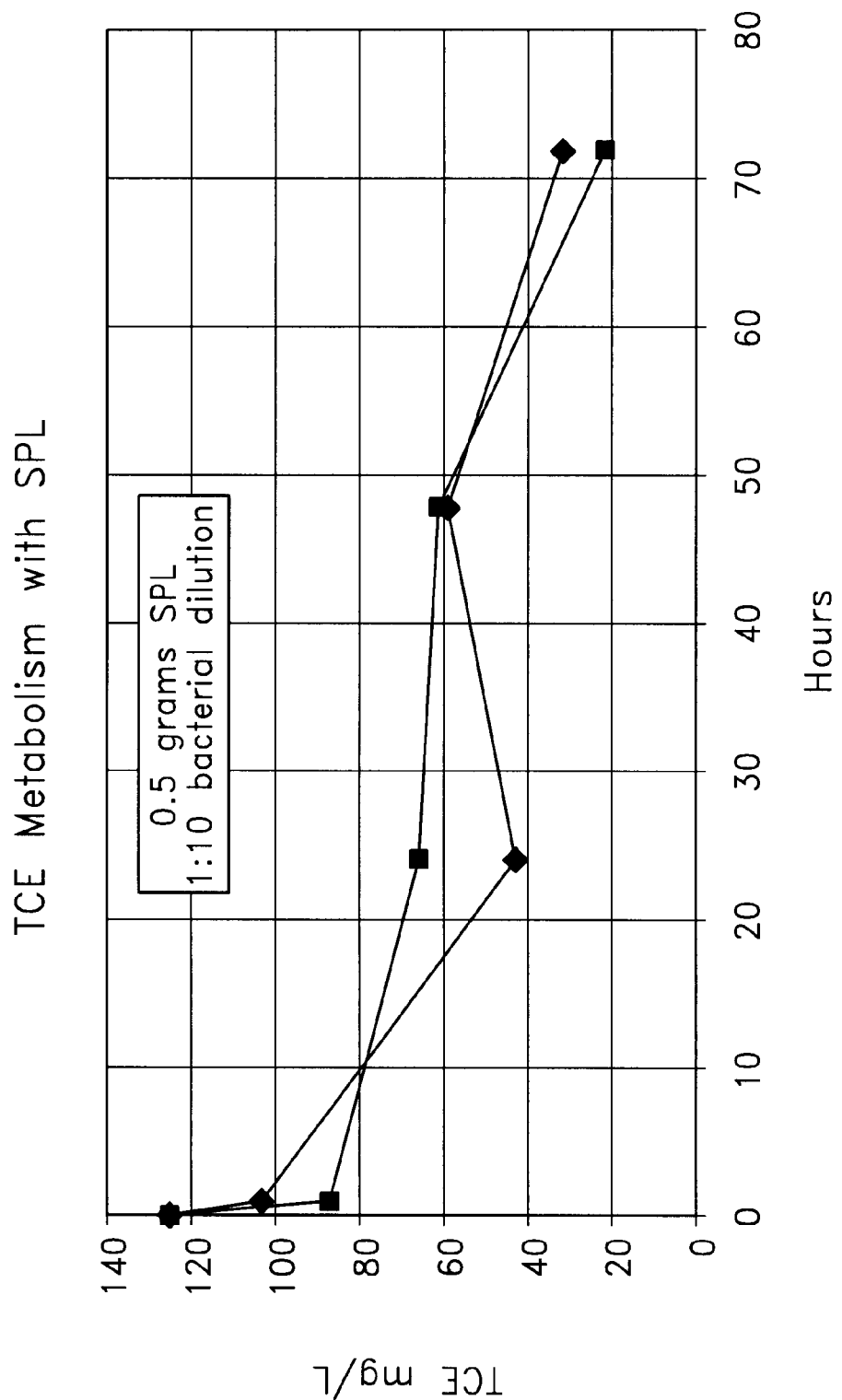
FIG. 5 is a graph showing reduction in TCE in two separate test tube tests using a sterile sand substrate to which bacteria and sorbitol polylactate were added.

When a fully acclimated bacterial system is used, i.e. that which has been exposed to chlorinated hydrocarbons for some time, remediation occurs in a matter of days. FIG. 5 shows results for duplicate runs for reductions of TCE with an acclimated bacterial culture placed in the test tube system using sterile sand as the soil substrate. The acclimated bacteria, which were taken from the Reductive Dechlorination Reactor, were diluted 10 to 1 with distilled water and the sorbitol polylactate level was 0.5 grams. These results show very rapid utilization of TCE by these bacteria.

Figure 6:
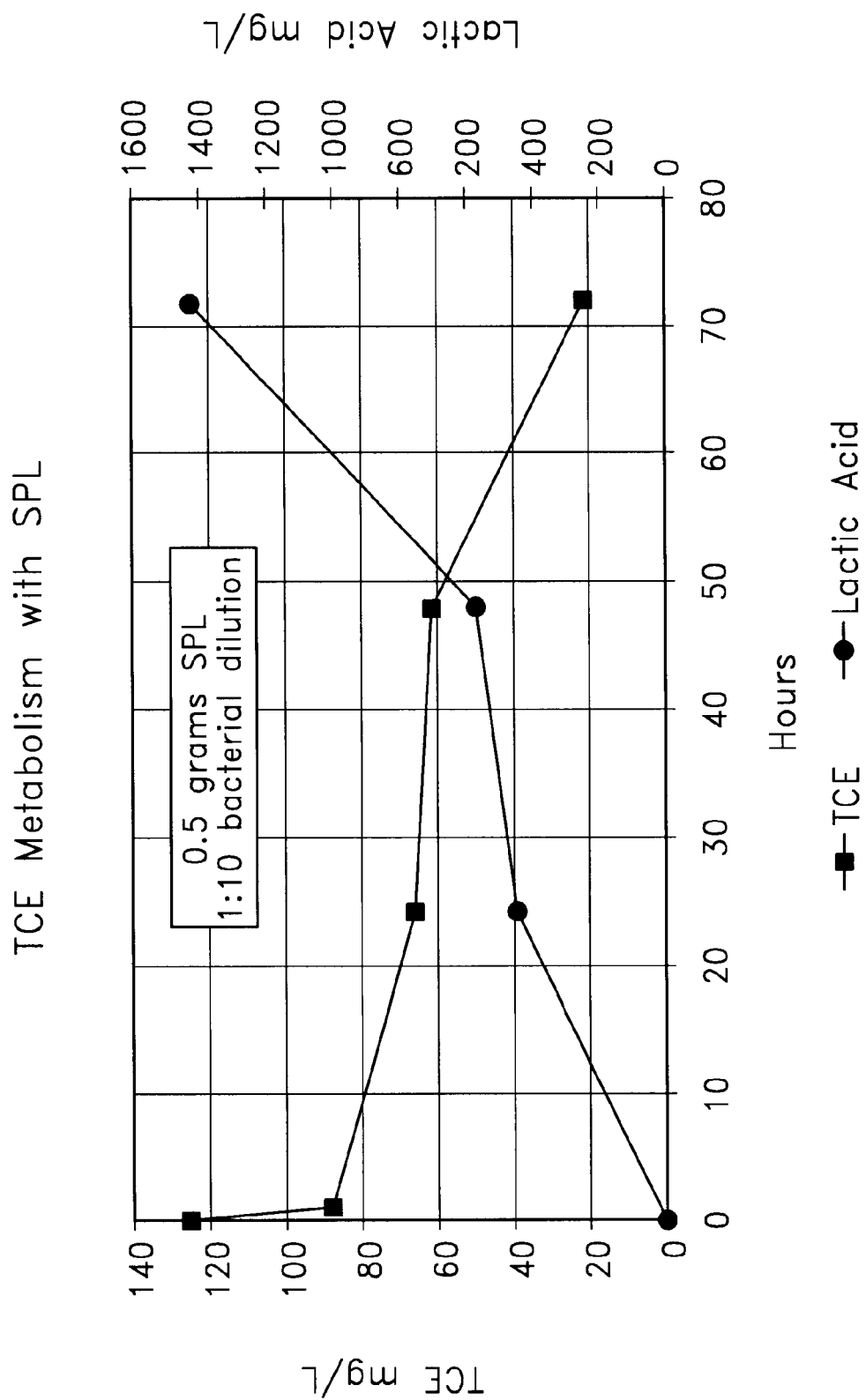
FIG. 6 is a graph showing the decrease in TCE and the concomitant rise in lactic acid concentration for one of the test tube tests of FIG. 5.

FIG. 6 shows one of the two runs shown in FIG. 5 with the lactic acid release data for that run plotted on the same graph. Note that the scale is in hours and this entire process only took 3 days. This only serves to highlight the importance of the bacterial consortium in metabolizing the TCE, producing the lactic acid from the lactate ester, and utilizing the lactic acid and the hydrogen produced therefrom.

Figure 7:
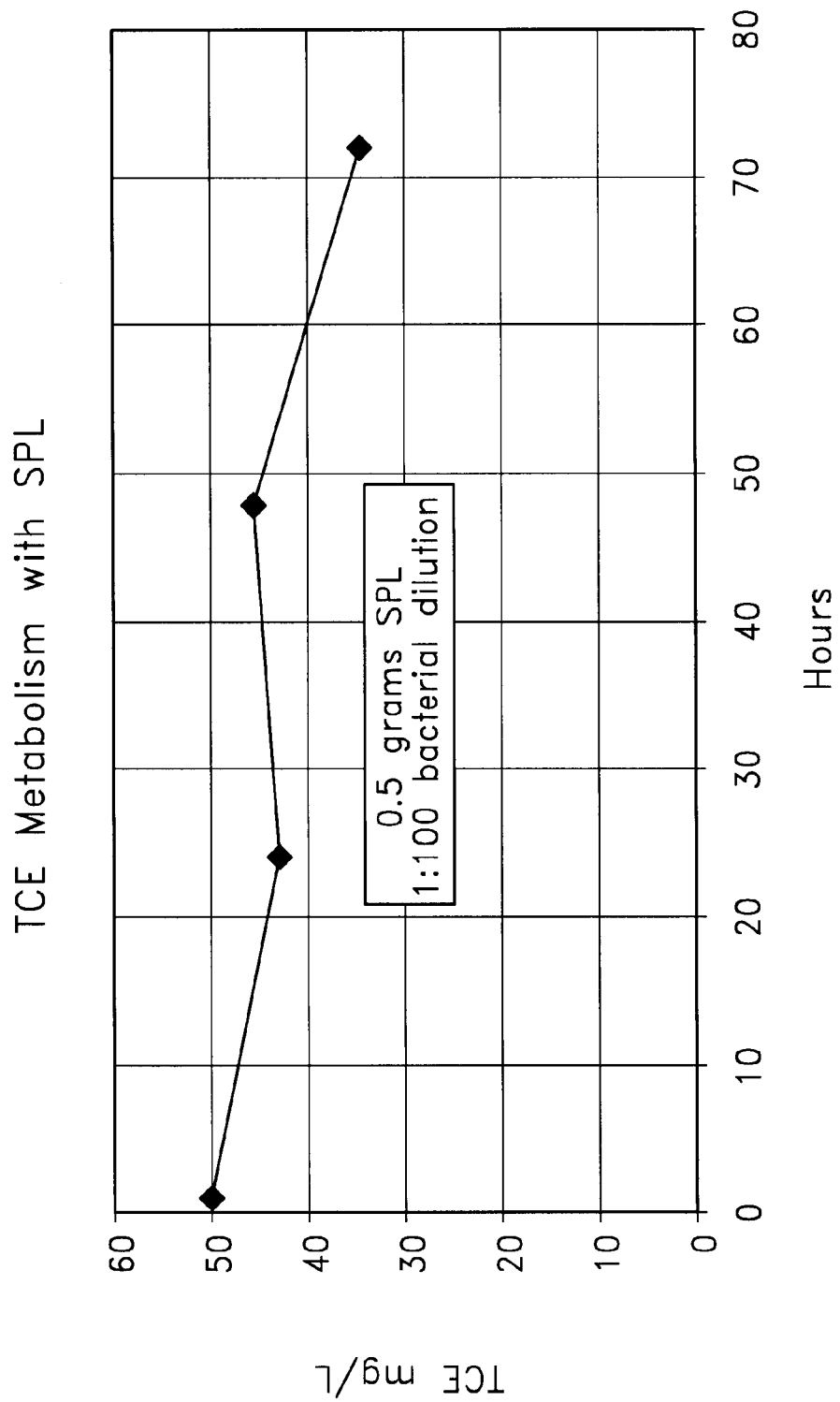
FIG. 7 is a graph showing the decreased rate of TCE metabolism in a test tube system of the type of FIG. 5 wherein the bacterial concentration is diminished by a factor of ten.

FIG. 7 shows that the rate of remediation, as indicated by the slope of the line, is dramatically reduced as the bacterial count is lowered. This run was made with 10 times fewer bacteria than the data in FIGS. 5 and 6.

Figure 8:
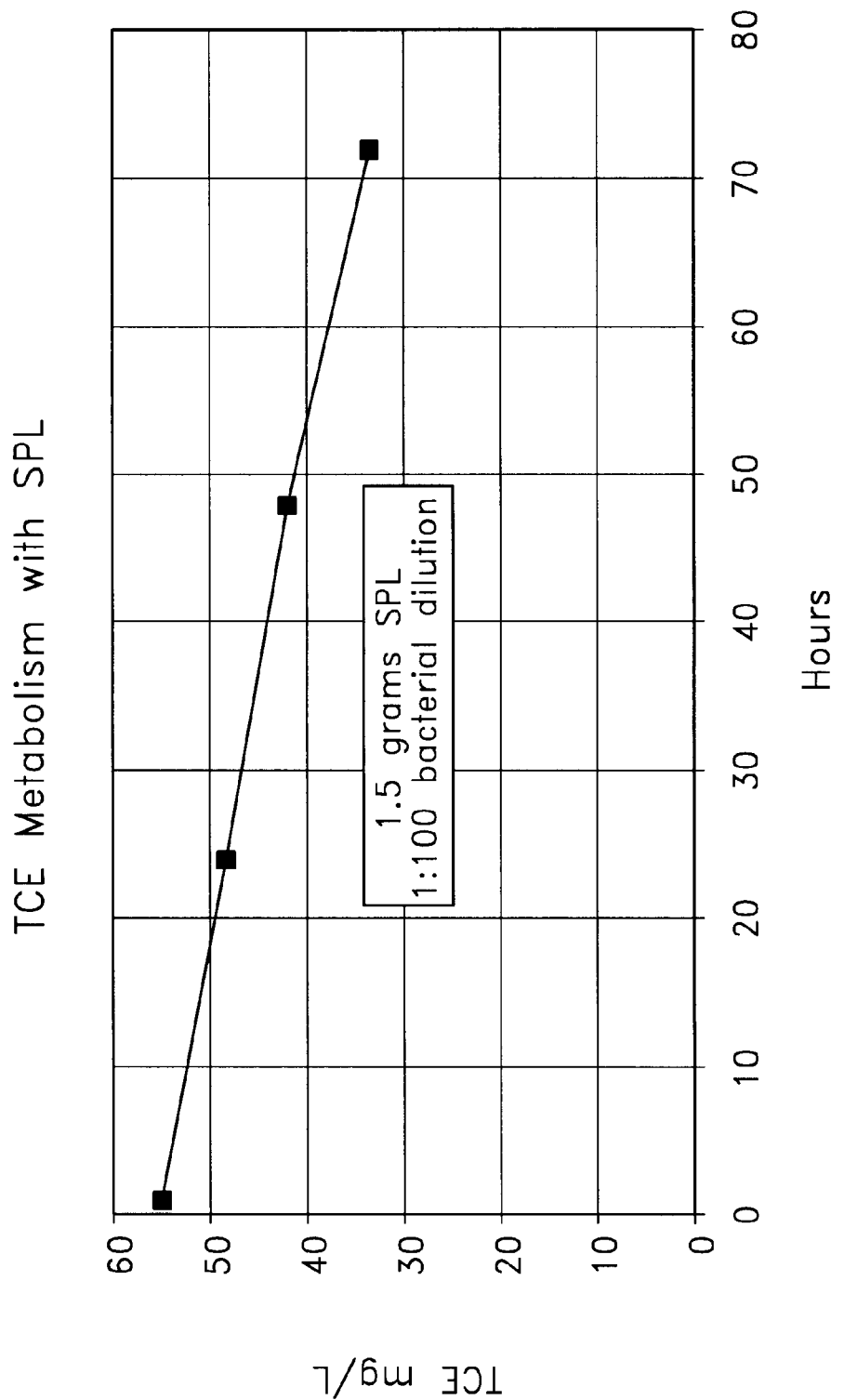
FIG. 8 is a graph showing the rate of TCE metabolism in a test tube system of the type of FIG. 7 in which three times the sorbitol polylactate has been added.

FIG. 8 shows a system with the same bacterial count as FIG. 7, but having three times the quantity of polylactate ester added. In looking at FIG. 8 it is seen that there is not much improvement in rate when more polylactate ester is added. The system is clearly limited by the bacterial population. It should be recalled that all of this test system is expected to have a much larger bacterial population, particularly of chlorinated hydrocarbon acclimated dechlorinating bacteria, than anything found in the field. The bacterial population used here has been successfully utilizing chlorinated compounds for over a year in continuous culture.

The bacterial populations were measured using the three bacterial measures of aerobic TPC, anaerobic TPC and SRB counts. For the 1:100 dilution these values were 2,000 CFU/ml and 100 respectively, and for the 1:10 dilution the values were 20,000 CFU/ml and 1,000 respectively.

It has been found that field sites for which polylactic acid has been shown to be effective have counts in this same range. Soil brought to the laboratory from one of these sites and placed in the Aquifer Simulation Vessel showed remedial activity in two weeks after start up. The system has been consistently reducing a 10 mg/L feed of TCE to levels where one cannot detect any daughter products after 8 weeks.

EXAMPLE 8

Remediation of TCE by Sorbitol Polylactate in a Test Tube System

Figure 9:
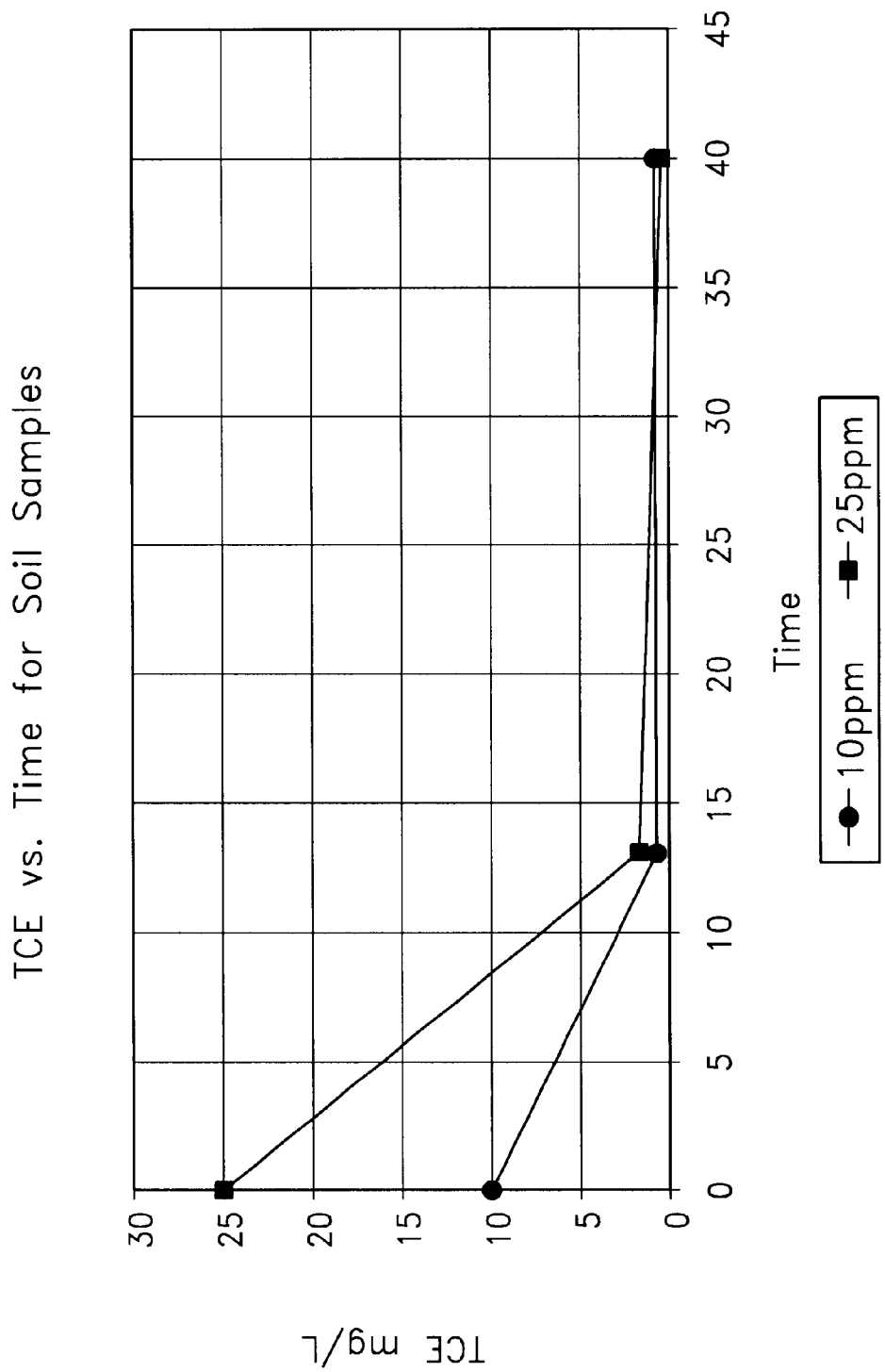
FIG. 9 is a graph showing the decrease in TCE concentration with time for two soil samples having different initial concentrations of TCE, to which sorbitol polylactate was added.
Figure 10:
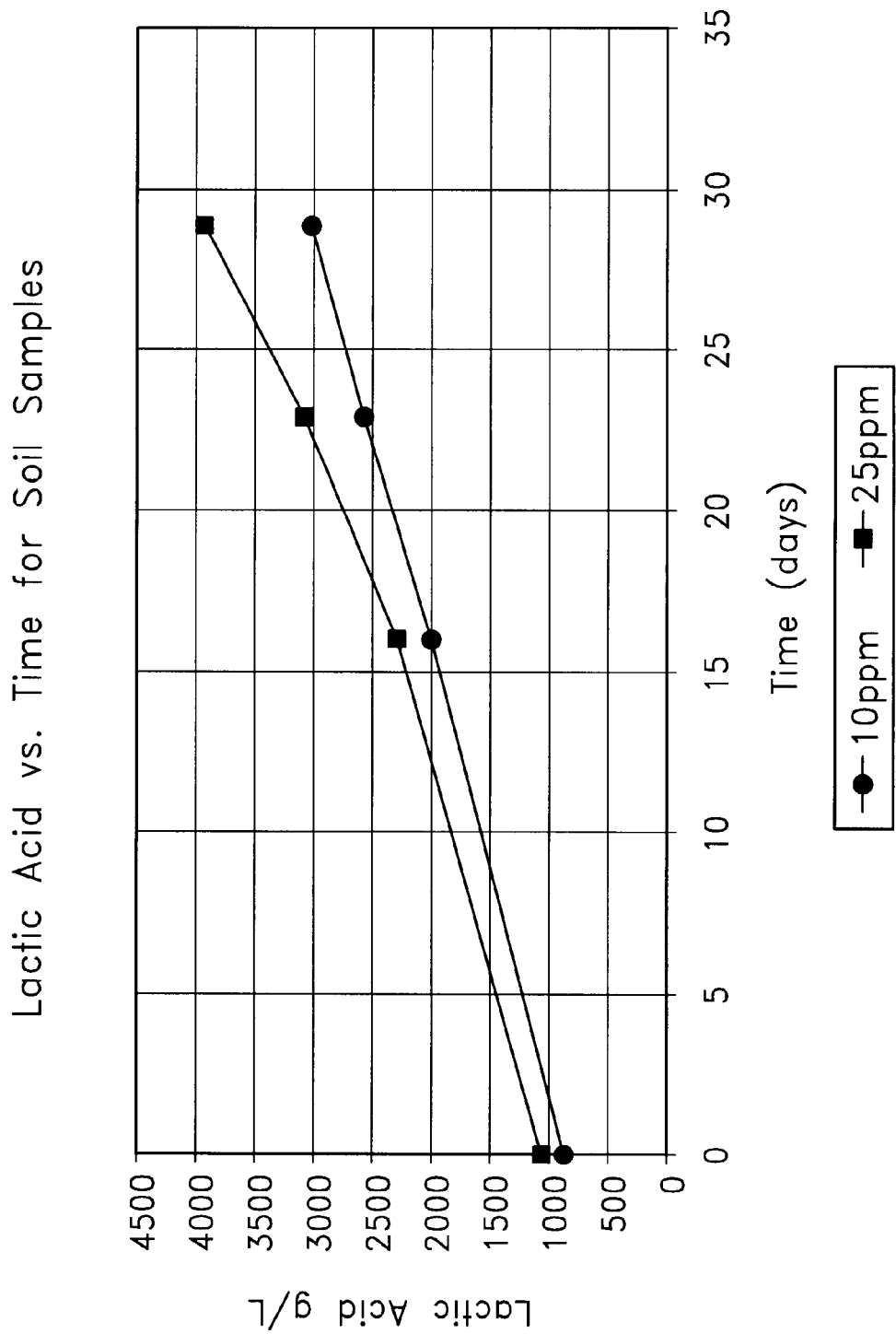
FIG. 10 is a graph showing the increase in lactic acid concentration with time for the two soil samples of FIG. 9.

Soil samples were homogenized by manual stirring and a 10 gram aliquot was added to each of 7 test tubes of approximately 200 ml total volume. In three of the test tubes 150 ml of distilled water containing 25 mg/L of TCE was added along with 1.5 grams of sorbitol polylactate (SPL). In three of the test tubes 10 mg/L of a TCE solution is added along with 1.5 grams of SPL. The last test tube was the microbe control to which only distilled water was added. The test was run for 4 weeks, during which time four samples were taken. The samples from each of the 6 TCE test tubes were split and analyzed for both chlorinated compound content and organic acid content. The results for TCE and lactic acid are shown in FIGS. 9 and 10 respectively.

Reductive Dechlorination Reactor Studies

The Reductive Dechlorination Reactor (RDR) may be used to determine the efficacy of different polylactate ester formulations. The system recirculates chlorinated hydrocarbon laden water, by means of a peristaltic pump, through a bed of activated microbes that are capable of metabolizing chlorinated hydrocarbons. The advantage of this is that it can be fed and monitored continuously. Due to this, continuous removal kinetics can be studied in the system.

The system comprises a packed bed of glass beads which simulate the soil system. Bacteria that are acclimated to the dechlorination of TCE and PCE are allowed to grow over the beads. The reactor also has sample and feed ports for gas and liquid, which aid in maintaining the anaerobic atmosphere while allowing addition of materials and the removal of samples. In addition to providing remediative capabilities, the reactor serves as a source of active and chlorinated hydrocarbon-acclimated bacteria For a two liter reactor having a working volume of 600 ml, the feed and remediation rates are about 10 mg/day of TCE. Smaller reactors have lower feed and remediation rates.

To initiate the system, the polylactate ester is placed in a tube between the pump and the packed bed. The TCE laden solution flows out of the liquid reservoir to the pump, from which it is pumped through the tube containing polylactate ester, followed by the packed bed, whereafter it drips back into the liquid reservoir. Each day the solution is augmented with 5 mg/L of TCE and sampled. TCE is measured by gas chromatography and lactic acid (from polylactate ester) is measured by liquid chromatography. After approximately 8 hours the solution is sampled and measured again. This procedure is followed for several days until it is certain that the particular formulation of polylactate esters facilitates reductive dechlorination of TCE.

The system is maintained in the anaerobic state by keeping it closed and adding and removing samples through the valves and sampling port. The system contains an oxygen indicator to indicate the presence of dissolved oxygen. If any air accidentally penetrates the system it usually returns to an anaerobic condition in several hours. This is facilitated by the presence of lactic acid.

As of yet there has not been a single case where polylactate esters failed to facilitate remediation of TCE remediation at all levels of TCE added to the system. It is interesting to note that when TCE is added to the system there is an initial burst of vinyl chloride in the gas headspace analysis. As the TCE level reduces to near zero the vinyl chloride also decreases and is eventually remediated by the time of the next inoculation of TCE.

EXAMPLE 9

Use of Glycerol Tripolylactate in an RDR

A bioreactor was set up using a 250 ml Erlenmeyer flask, a peristaltic pump, and a packed column of a mixed culture of microorganisms known to degrade chlorinated hydrocarbons. A glass tube was placed in the feed line between the liquid reservoir in the flask and the packed column after the peristaltic pump. The entire system contained 60 ml of liquid. Two grams of glycerol tripolylactate was placed on a piece of metal inside the glass tube. The liquid circulated through the entire system. TCE was added, 5 mg/ml, per day every day, and the system was monitored for TCE using gas chromatography and for lactic acid using ion chromatography. Liquid samples were taken for lactic acid analysis and head space gas samples were taken for TCE and vinyl chloride (a primary degradation product) analysis. Using this equipment, reduction of TCE, the initial rise and then the subsequent reduction of vinyl chloride, and the utilization of the polylactate ester including the lactic acid levels in the system were monitored. All of the TCE or PCE was consumed in about 24 hours, with 80% of the reduction occurring within 6 to 8 hours.

Aquifer Simulation Vessel (ASV) Studies

The Aquifer Stimulation Vessel (ASV) is used to establish the influence of important field-scale parameters on the efficacy of polylactate esters. The ASV comprises a horizontal pipe packed with soil through which water flows, to simulate an underground aquifer. The ASV has sample ports at intervals along the pipe to allow sampling of the contents. Polylactate ester is placed in the system at the the first port, where the flow of the water originates, such that the flowing water will pass through the polylactate esters and then move through the length of the pipe. The water added can have various levels of contaminants such as chlorinated hydrocarbons. Measurement of remediation rates is possible in this system, as well as the distribution of lactic acid and its breakdown products.

One preferred use of the ASV is that used in the experiements described herein. That ASV comprises a 6.5 foot long tube having an internal diameter of 5.75 inches. The interior of the tube is filled with soil, preferably contaminated soil from the field. The system has a volume of 2025.44 $in^2$ with approximately 30% of that volume being open space (porosity). Sample ports are placed preferably every 6 inches along the length of the tube. The first port is preferably that through which the water first flows and also that through which the polylactate esters are added. The contaminated water is held in a reservoir at the beginning of the tube and connected to a nitrogen tank. The nitrogen is added to the reservoir headspace to help prevent any volatile chlorinated hydrocarbons, such as TCE, from volatilizing and escaping from the container. The flow rate through the ASV is preferably 0.3 to 2.0 ft/day.

In the experiments, at least 2 $ft^3$ of soil is collected from the site for packing in the tube of the ASV. The water containing chlorinated hydrocarbons, is placed in the reservoir, and is added at the water inlet and allowed to equilibrate over a period of days. Polylactate ester is then added, and the system is allowed to run continuously for the entire length of the experiment. Periodically, preferably at least weekly, samples are taken from at least 5 of the ports and analyzed for chlorinated compounds and organic acids, according to the methods discussed above in relation to the test tube method.

EXAMPLE 10

Bioremediation of TCE in the ASV

In the initial studies, the ability of polylactate esters to facilitate the reductive dechlorination of TCE was measured. In the experiments, an ASV was filled with soil. TCE was then added to the soil at the water inlet side at a concentration of approximately 6 mg/L. The ASV was allowed to acclimate over a period of 6 days, during which time baseline TCE concentration profiles were developed. Finally, a quantity of sorbitol polylactate was added to the inlet side and the system was run at a flow rate of 0.5 ft/day for a period of 9 days. Results from one experiment in which TCE levels were measured at days 1, 6, and 9 at each six inch interval along the ASV are presented in Table 1 below.

Data indicate an overall reduction in TCE of 86%.

TABLE 1

Concentration of TCE Over Time in the ASV

| Distance from | Concentration of TCE in mg/L | | |
| --- | --- | --- | --- |
| Water Inlet | Day 1 | Day 6 | Day 9 |
| 0 ft (0 cm) | 6.8 | 5.6 | 1.1 |
| 1 ft (30.5 cm) | 9.9 | 10.2 | 0.0 |
| 1.5 ft (45.7 cm) | 14.6 | 6.8 | 3.2 |
| 2.5 ft (76.2 cm) | 3.8 | 1.7 | 0.6 |
| 3 ft (91.44 cm) | — | 1.4 | 0.0 |
| 3.5 ft (106.7 cm) | — | 0.0 | 0.0 |
| 4 ft (121.9 cm) | — | — | 0.1 |
| 4.5 ft (137.2 cm) | — | 0.0 | 0.0 |
| 5 ft (152.4 cm) | 1.2 | — | — |
| 5.5 ft (167.6 cm) | — | 3.8 | 0.0 |

Field Studies

In addition and subsequent to the laboratory studies, field studies were performed in which polylactate esters were used to aid bioremediation of chlorinated hydrocarbons.

EXAMPLE 11

Remediation of Chlorinated Solvents with Sorbitol Polylactate in an Aquifer

The effects of sorbitol polylactate (SPL) were studied in a test involving the placement of eleven PVC canisters containing about 11.3 pounds (5.14 kg) each of SPL in the ground. Each canister had 3 inch (7.6 cm) outer diameter, 2¾ inch (7.0 cm) inner diameter, and was 4 ft (121.9 cm) long. The canisters, each of which has a plurality of holes drilled in it to allow for the movement of SPL from the canister into the well, were each placed in a five inch monitoring well containing TCE, cis-1,2-DCE, and VC. Aquifer materials comprised sand with a calculated groundwater velocity of less than 0.1 ft/day.

Figure 11:
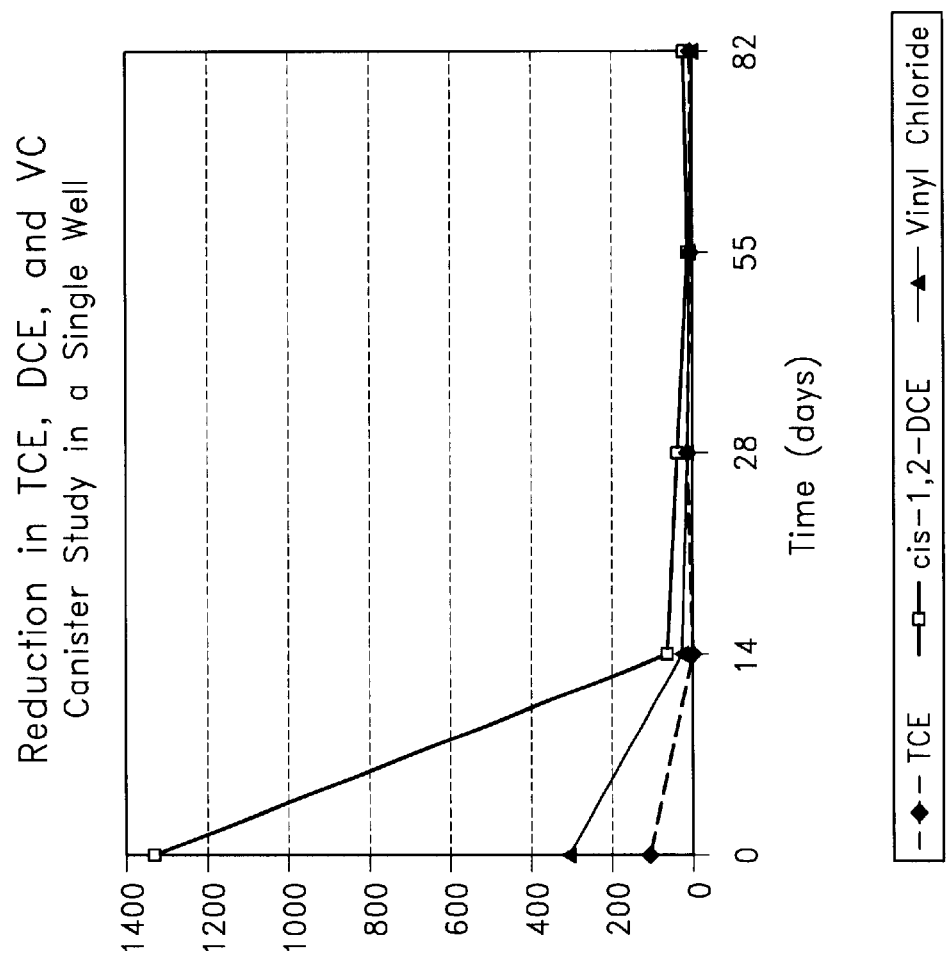
FIG. 11 is a chart showing the reduction of TCE, DCE and VC in a well following the addition of sorbitol polylactate.
Figure 12:
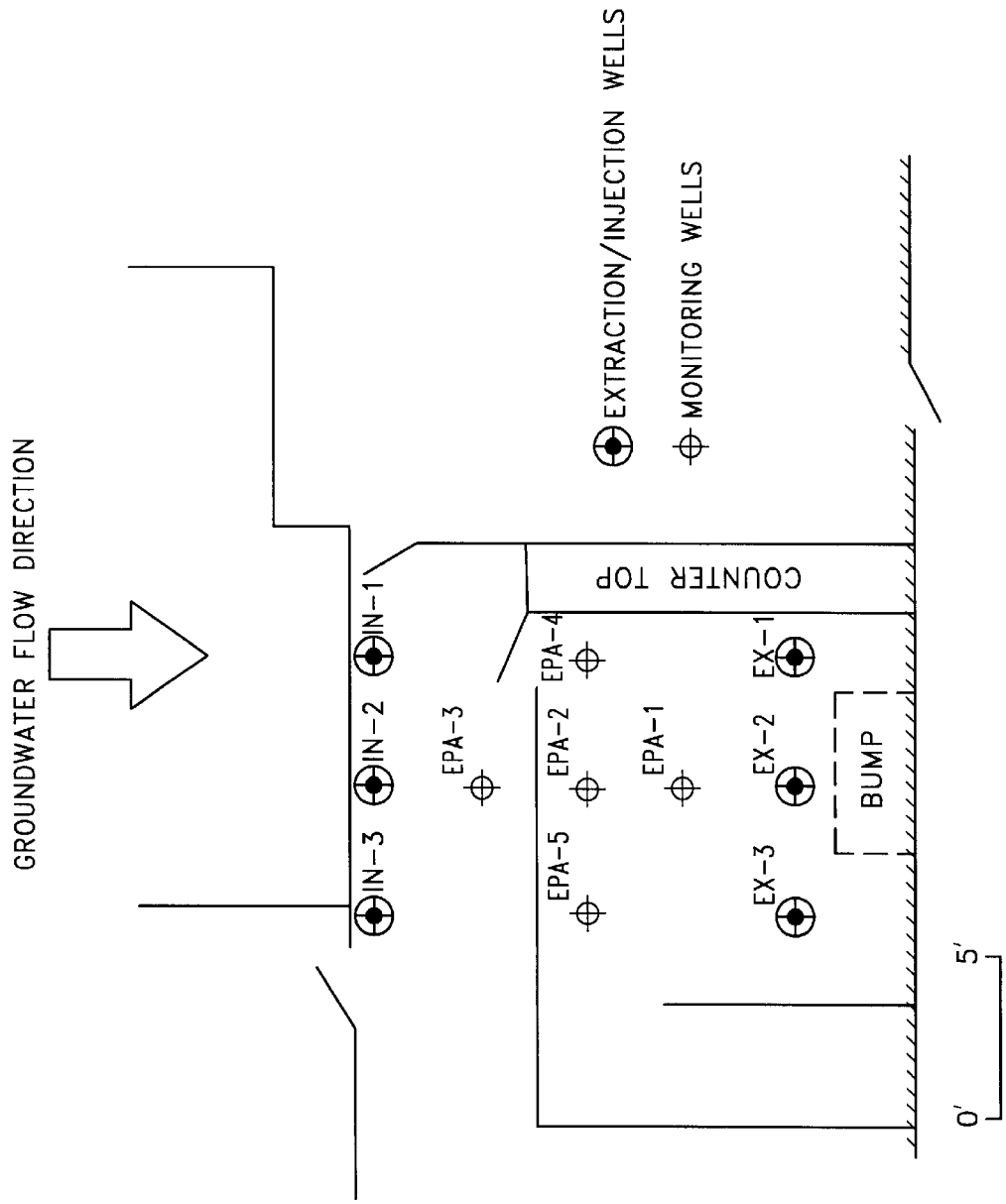
FIG. 12 is a schematic of the recirculating well system used in the field experiment of Example 12.

The presence of SPL generated anaerobic conditions indicated by an absence of dissolved oxygen and highly negative redox levels. Following approximately 82 days of treatment with SPL, TCE, cis-1,2-DCE, and VC were reduced 96%, 98%, and 99%, respectively, based on measurements in the well. These results are presented graphically in FIG. 11. The absence of dissolved oxygen and highly negative redox levels confirmed the existence of a highly reduced environment required for SPL to be effective.

EXAMPLE 12

Remediation of Chlorinated Solvents with Sorbitol Polylactate in an Aquifer

Figure 13:
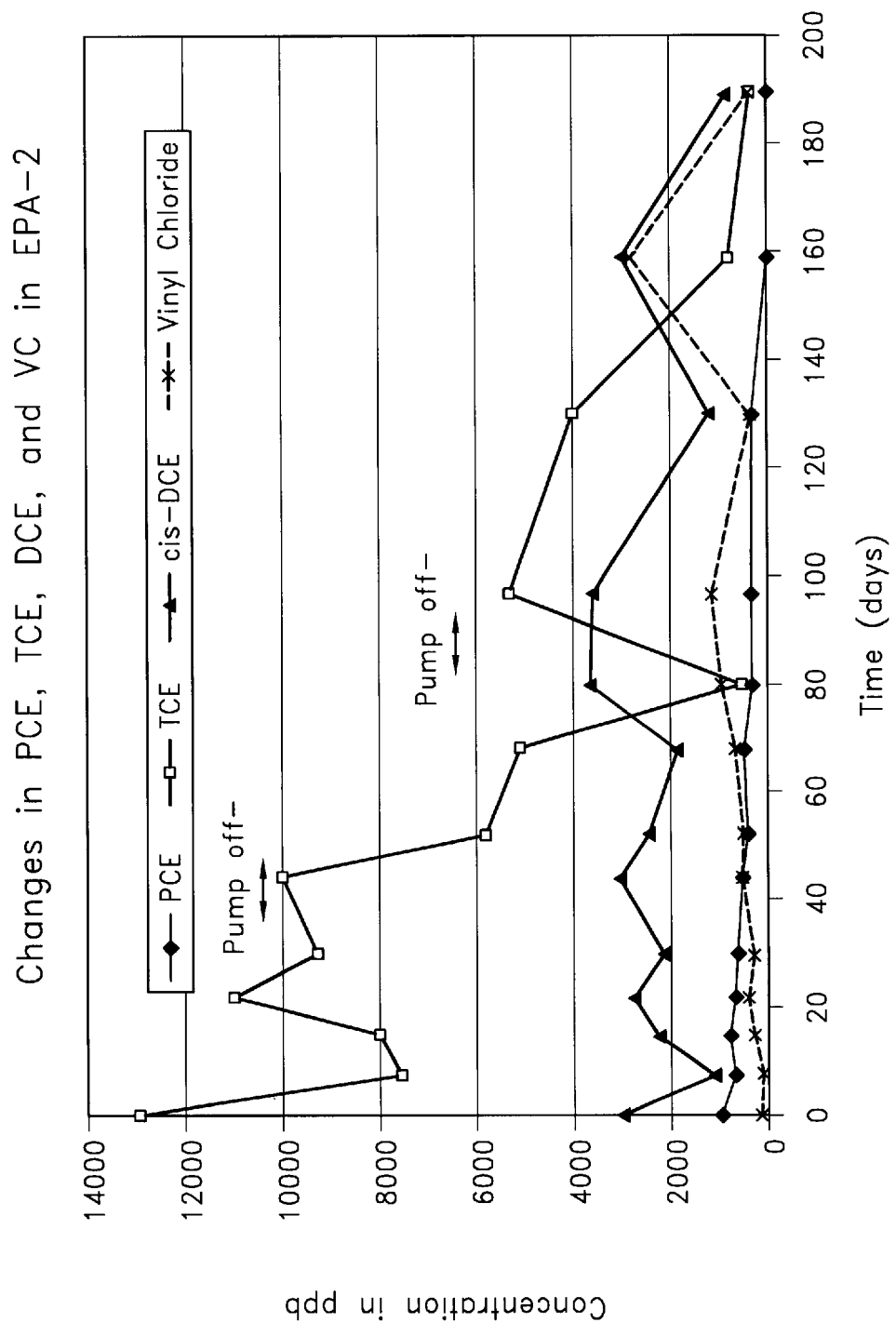
FIG. 13 is a chart showing the concentrations of chlorinated ethenes in a well used to monitor the recirculating well system of FIG. 12 over time in a system treated with sorbitol polylactate.
Figure 14:
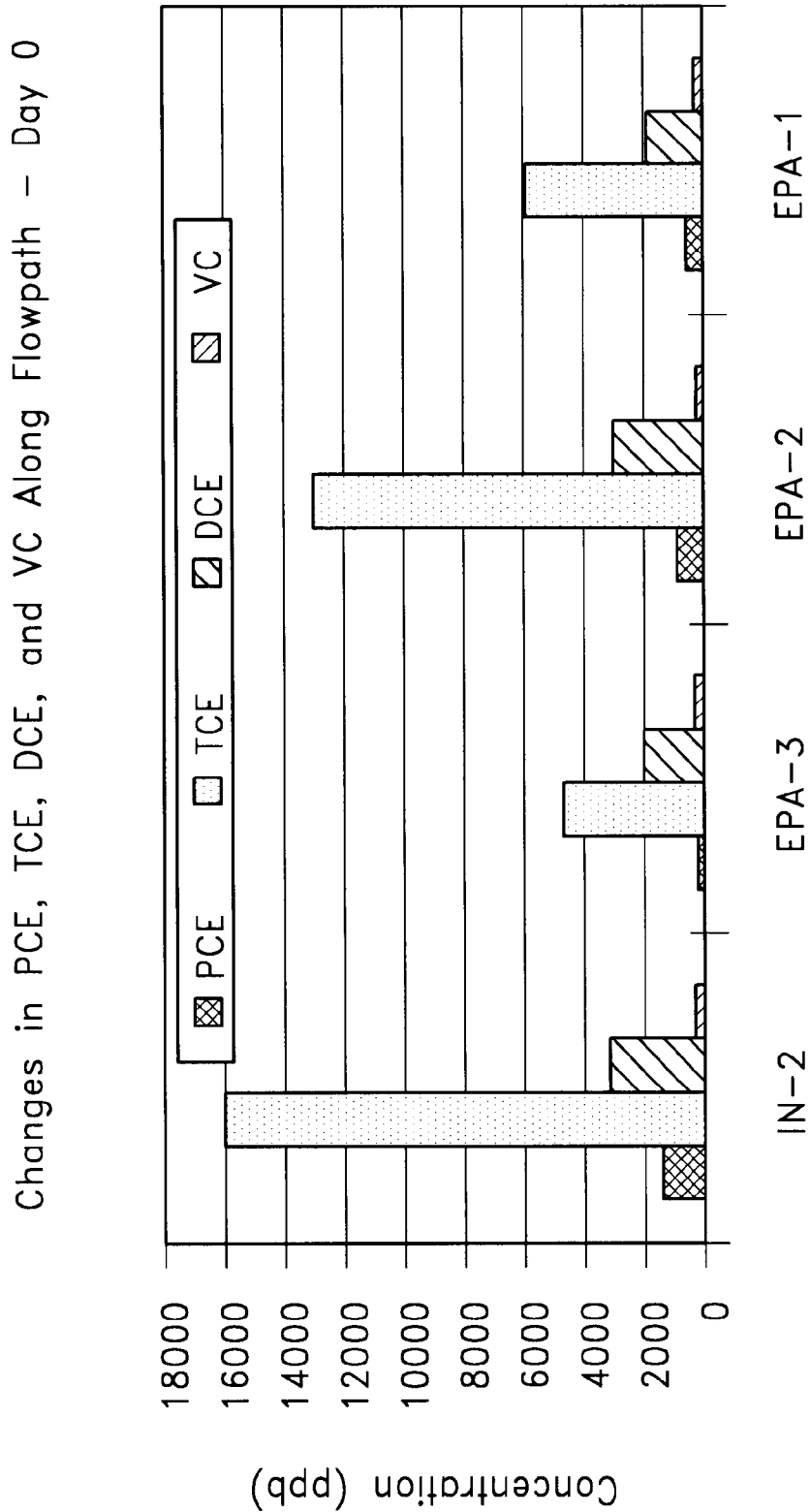
FIG. 14 is a chart showing the concentrations of chlorinated ethenes in four wells, an injection well and three monitoring wells, before addition of sorbitol polylactate.
Figure 15:
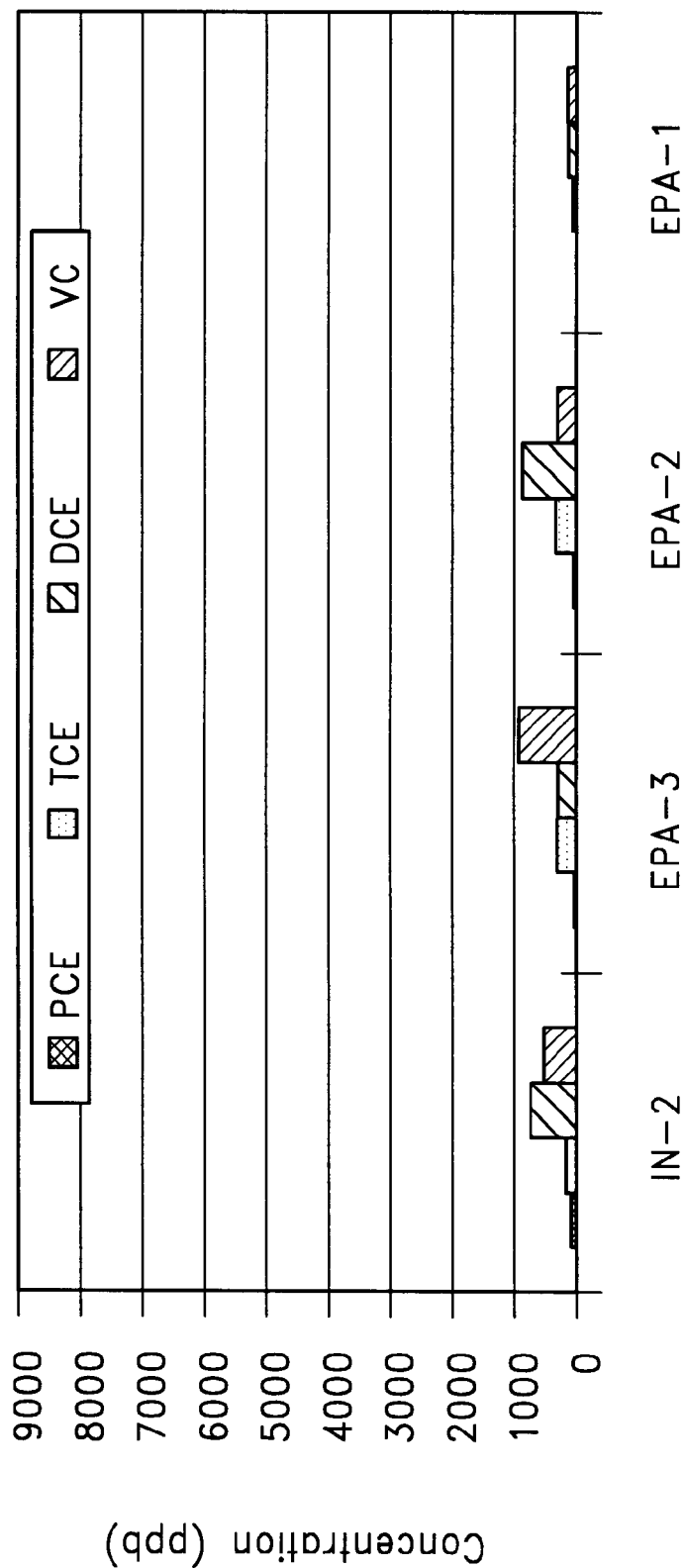
FIG. 15 is a is a chart showing the concentrations of chlorinated ethenes in the same four wells of FIG. 14 one hundred eighty-nine days following the addition of sorbitol polylactate.

The efficacy of sorbitol polylactate (SPL) in remediating chlorinated hydrocarbons was demonstrated in a recirculating well system as illustrated in FIG. 1. Approximately 11.3 pounds (5.14 kg) of SPL was placed in each of 6 PVC canisters (3 inch (7.6 cm) outer diameter, 2¾ inch (7.0 cm) inner diameter, 4 ft (121.9 cm) long, each) having a plurality of holes drilled therethrough. Two canisters were inserted into each of three injection wells. Circulation of water through the system was maintained between the extraction and re-injection wells. Monitoring over a period of 189 days indicated dramatic reductions in redox potential, PCE and daughter products TCE, cis-1,2-DCE, and VC. This is represented in FIG. 13 for centrally located monitoring well EPA-2, and in FIGS. 14 and 15 for a transect through the recirculation system from injection well IN-2 through monitoring wells EPA-3, EPA-2, and EPA-1.

It is important to note that the recirculation system pump failed intermittently between days 30 and 42, and again between days 78 and 95. The rebound of contaminants and subsequent decreases related to this pumping anomaly underscored the impact of SPL in this system. Thus, SPL was shown to reduce redox levels both in wells in which it is placed and along the downgradient flow path. Furthermore, the ability of SPL to aid the biodegradation of PCE as well as daughter products TCE, cis-1,2-DCE, VC, and ethene was demonstrated.

EXAMPLE 13

Remediation of Chlorinated Solvents with Glycerol Polylactate in an Aquifer

Figure 16:
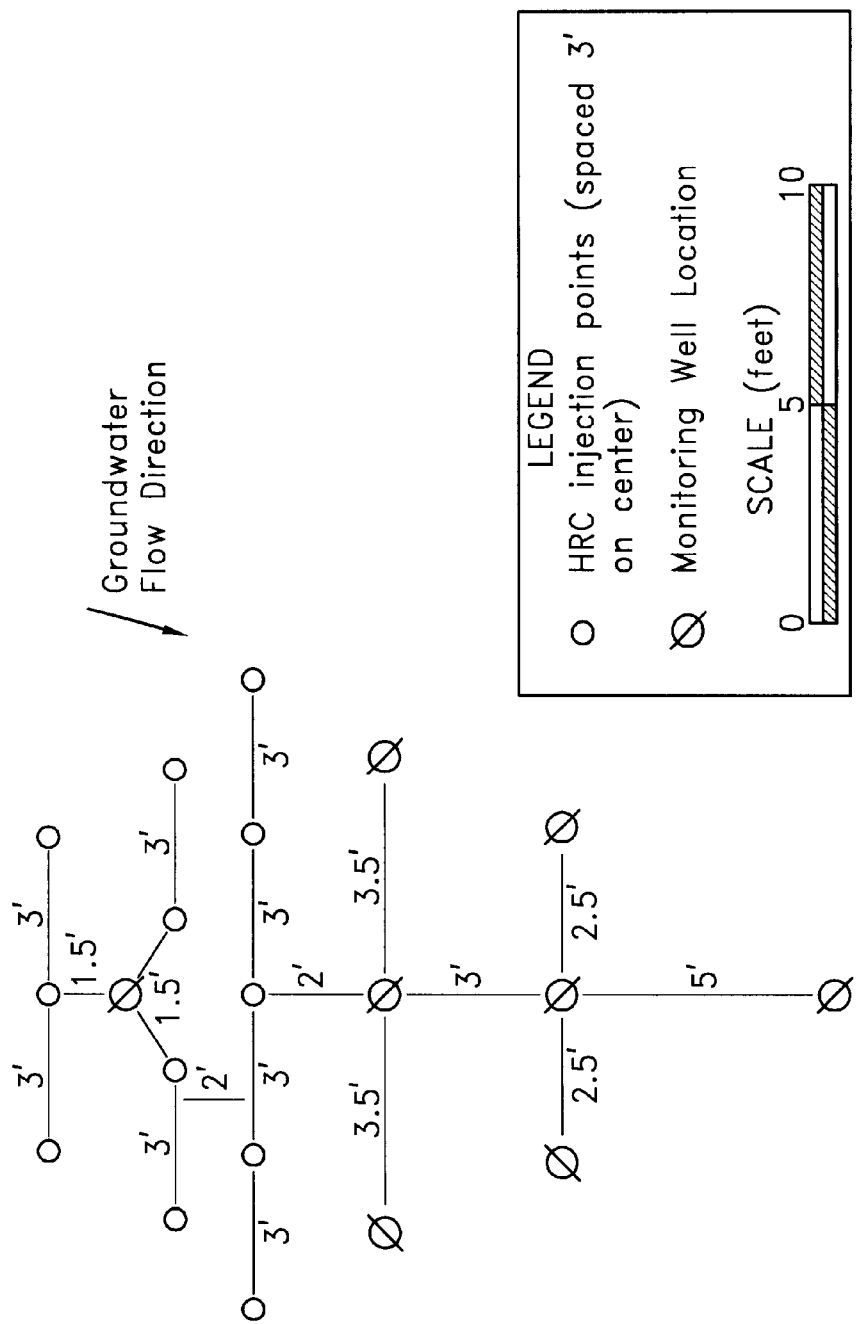
FIG. 16 is a schematic showing the points at which glycerol polylactate was injected into a system and groundwater monitoring points in the experiment of Example 13.

Two hundred forty pounds of glycerol polylactate (GPL) was pressure injected using direct push methods into an aquifer containing PCE. Aquifer materials comprised sand with a calculated groundwater velocity of less than 0.1 ft/day. The GPL was injected via twelve delivery points in a sixty square foot area, as illustrated in FIG. 16.

Figure 17:
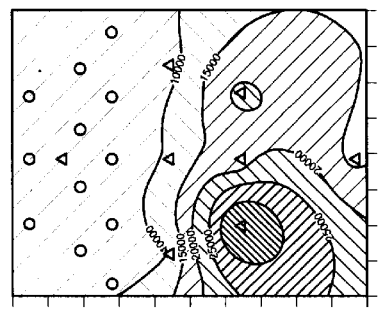
FIG. 17 is a series of drawings showing the change in concentration of PCE over time in the system of Example 13.
Figure 17:
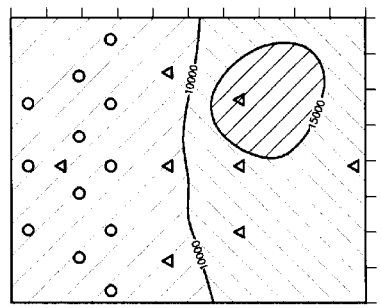
Figure 17:
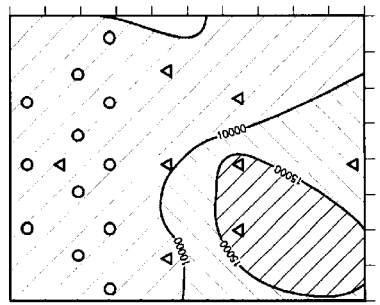
Figure 17:
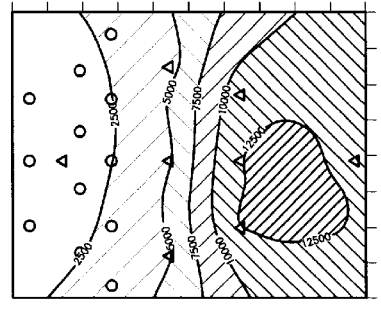
Figure 17:
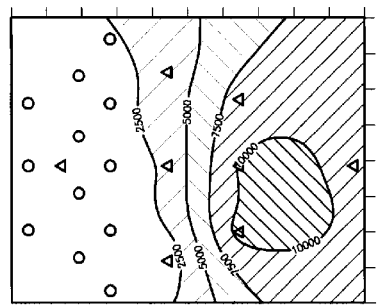
Figure 17:
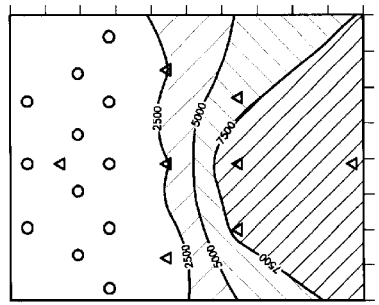
Figure 18:
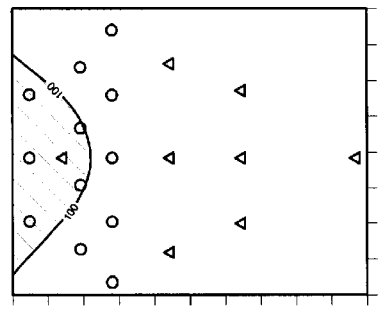
FIG. 18 is a series of drawings showing the change in concentration of TCE over time in the system of Example 13.
Figure 18:
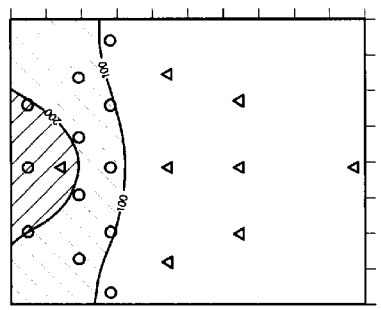
Figure 18:
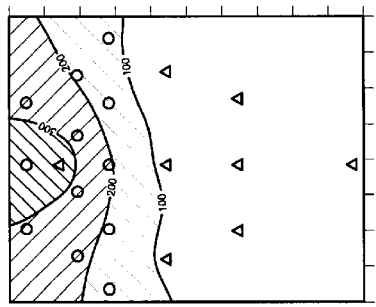
Figure 18:
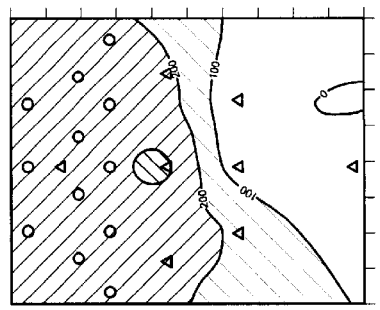
Figure 18:
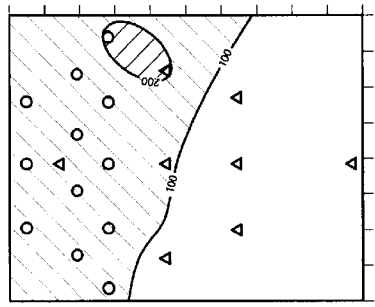
Figure 19:
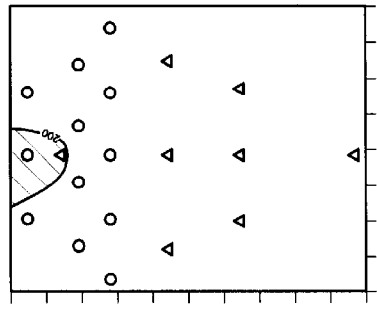
FIG. 19 is a series of drawings showing the change in concentration of cis-1,2-DCE over time in the system of Example 13.
Figure 19:
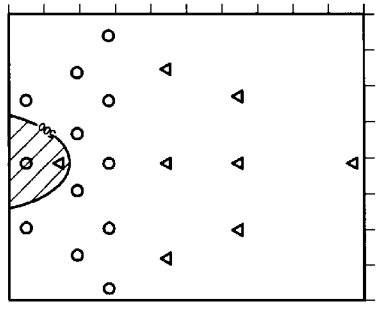
Figure 19:
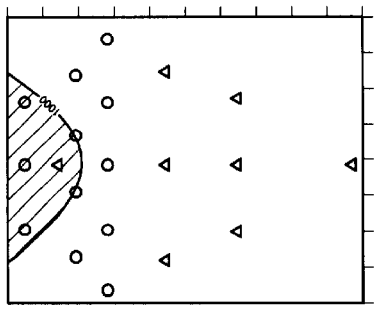
Figure 19:
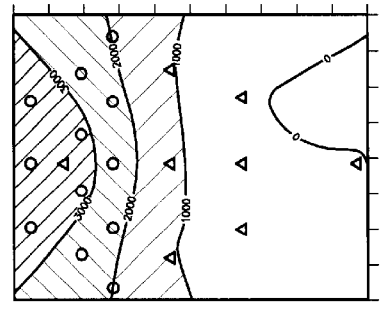
Figure 19:
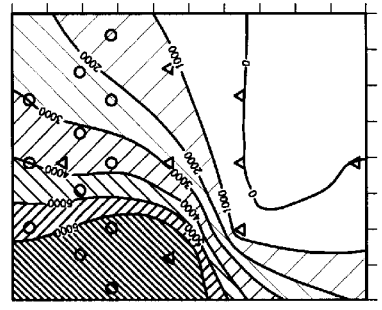
Figure 19:
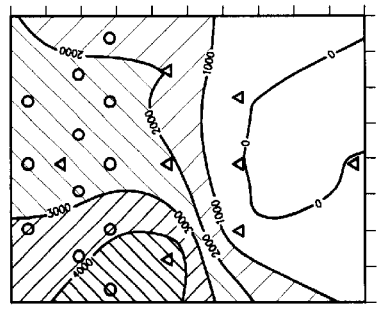
Figure 20:
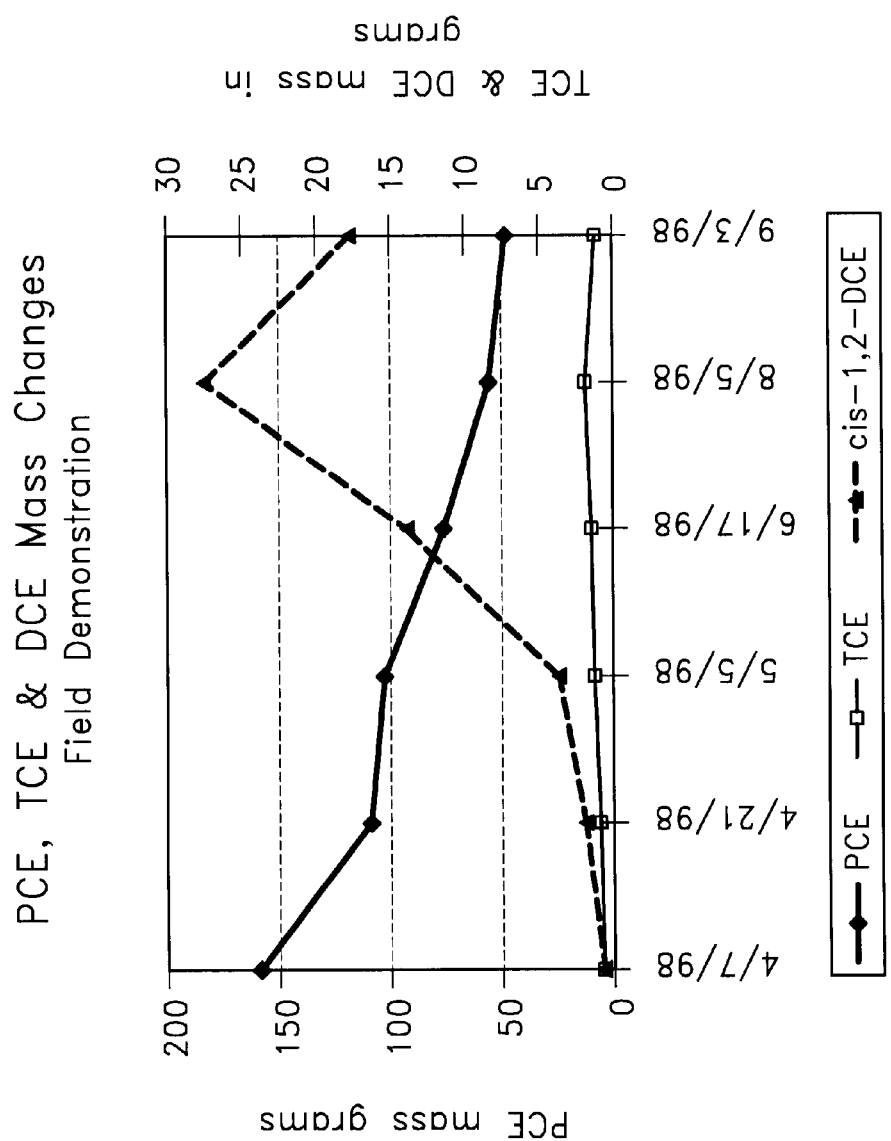
FIG. 20 is a graph showing the total mass change of chlorinated ethenes described in FIGS. 17–19 over time in the system of Example 13.

Reduction of PCE relative to GPL injection points and existing monitoring well locations was measured and is presented in FIG. 17. Approximately five months following the installation of GPL, PCE mass was reduced 111 grams, representing a reduction of 70%. Concurrent increases in PCE-degradation daughter products, TCE and cis-1,2-DCE, were also documented, and are presented in FIGS. 18 and 19 respectively. TCE and cis-1,2-DCE levels rose continuously through the first 120 days, as would be expected of sequential degradation products. A subsequent slight decrease in TCE and cis-1,2-DCE levels started on about day 120 and continued through day 148 as the sequential degradation products were acted upon in turn. This decrease was due to the onset of reductive dechlorination of these compounds. Mass balance results of 27% to 46% were an important indicator that the GPL injections facilitated contaminant removal by biodegradation. Total mass changes are presented in FIG. 20.

The above description discloses the best mode contemplated of carrying out the present invention. This invention is susceptible to modifications in the methods and materials, such as the choice of hydroxy acid, esterification alcohol, or materials used in the formulations and alterations in the equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A composition comprising a multifunctional alcohol ester of a poly(hydroxy acid), wherein said composition has the formula:

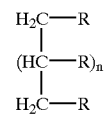

wherein R is

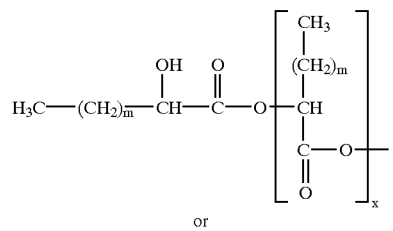

or

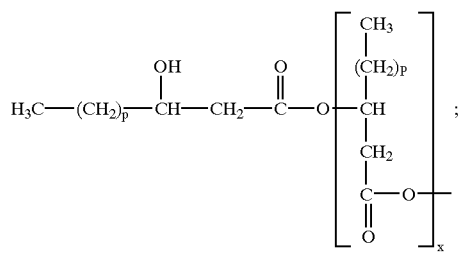

n=1 to 4;
m=0 to 3;
p=0 to 2; and
x=1 to 9.

2. The composition of claim 1, wherein said composition has the formula:

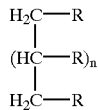

wherein R is

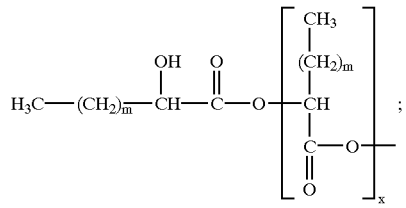

n=1 to 4;
m=0 to 3; and
x=1 to 9.

3. The composition of claim 2, wherein x=3.
4. The composition of claim 2, wherein n=1.
5. The composition of claim 2, wherein n=3.
6. The composition of claim 2, wherein n=4.
7. A composition of matter, comprising:
65–99% by weight composition according to claim 1; and
1–35% by weight inorganic salts.
8. The composition of claim 7, further comprising 30% or less by weight of one or more compounds selected from the group consisting of nutrients, buffers and pH modifiers, ethylene, chelating agents, surfactants, vitamins, enzymes, compounds that inhibit competing microorganisms, and bacteria and other microbes.
9. The composition of matter of claim 7, wherein said composition comprises glycerol tripolylactate, wherein n=1 and m=0.
10. The composition of matter of claim 7, wherein said composition comprises xylitol pentapolylactate, wherein n=3, m=0, and x=4.
11. The composition of matter of claim 7, wherein said composition comprises sorbitol hexapolylactate, wherein n=4, m=0, and x=5.
12. A composition of matter, comprising:
14–98% by weight composition according to claim 1;
1–15% by weight inorganic salts; and
1–85% by weight of at least one diluent which does not interfere with the hydrolysis of an ester.
13. The composition of matter of claim 12, comprising 10–25% by weight of said diluent.
14. The composition of matter of claim 12, comprising 50–85% by weight of said diluent.
15. The composition of matter of claim 12, wherein said diluent is selected from the group consisting of water, glycerin, esters and alcohols.
16. The composition of matter of claim 12, wherein said diluent is selected from the group consisting of isopropyl alcohol, ethyl alcohol, ethyl acetate, and ethyl lactate.
17. The composition of claim 12, further comprising 30% or less by weight of one or more compounds selected from the group consisting of nutrients, buffers and pH modifiers, ethylene, chelating agents, surfactants, vitamins, enzymes, compounds that inhibit competing microorganisms, and bacteria and other microbes.
18. The composition of matter of claim 12, wherein said composition comprises glycerol tripolylactate, wherein n=1 and m=0.
19. The composition of matter of claim 12, wherein said composition comprises xylitol pentapolylactate, wherein n=3, m=0, and x=4.

20. The composition of matter of claim 12, wherein said composition comprises sorbitol hexapolylactate, wherein n=4, m=0, and x=5.
21. A process of making multifunctional alcohol esters of poly($\alpha$-hydroxy acids) of claim 2 comprising the steps of:
charging a reaction vessel with a solution of an $\alpha$-hydroxy acid:
adding a catalytic amount of a strong inorganic acid;
heating said reaction vessel to drive off water and cause polymerization resulting in a poly($\alpha$-hydroxy acid);
adding a multifunctional alcohol to said reaction vessel;
heating said reaction vessel to cause esterification of said poly($\alpha$-hydroxy acid); and
adding an inorganic base to neutralize at least some of said inorganic acid in said reaction vessel.
22. The process of claim 21, wherein said heating step to drive off water is done under vacuum.
23. The process of claim 21, wherein said $\alpha$-hydroxy acid is lactic acid.
24. The process of claim 21, wherein said poly($\alpha$-hydroxy acid) is on average polymerized to the tetralactate.
25. The process of claim 21, wherein said multifunctional alcohol is glycerol.
26. The process of claim 21, wherein said multifunctional alcohol is xylitol.
27. The process of claim 21, wherein said multifunctional alcohol is sorbitol.
28. The process of claim 21, wherein said multifunctional alcohol is a sugar.
29. The process of claim 21, wherein said multifunctional alcohol is pentaerythritol.
30. The process of claim 21, wherein said inorganic acid is phosphoric acid.
31. The process of claim 21, wherein a solvent is added with said $\alpha$-hydroxy acid and said solvent is removed following addition of said inorganic base.
32. The composition of claim 2, wherein m=0.
33. The composition of claim 8, wherein the nutrient is a compound selected from the group consisting of yeast extract, urea, potassium-containing compositions, nitrogen-containing compositions, phosphorus-containing compositions, sulfur-containing compositions, molydenum salts, iron salts, zinc salts, and copper salts.
34. The composition of claim 8, wherein the buffer and pH modifier is a compound selected from the group consisting of sodium carbonate and potassium carbonate.
35. The composition of claim 8, wherein the vitamin is vitamin $B_{12}$.
36. The composition of claim 8, wherein the enzyme is selected from the group consisting of lipase and esterase.
37. The composition of claim 17, wherein the nutrient is a compound selected from the group consisting of yeast extract, urea, potassium-containing compositions, nitrogen-containing compositions, phosphorus-containing compositions, sulfur-containing compositions, molydenum salts, iron salts, zinc salts, and copper salts.
38. The composition of claim 17, wherein the buffer and pH modifier is a compound selected from the group consisting of sodium carbonate and potassium carbonate.
39. The composition of claim 17, wherein the vitamin is vitamin $B_{12}$.
40. The composition of claim 17, wherein the enzyme is selected from the group consisting of lipase and esterase.

* * * * *